(12) United States Patent
Ushio

(10) Patent No.: US 7,961,339 B2
(45) Date of Patent: Jun. 14, 2011

(54) IMAGE FORMING APPARATUS AND IMAGE FORMING SYSTEM

(75) Inventor: Masaru Ushio, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1033 days.

(21) Appl. No.: 11/818,937

(22) Filed: Jun. 15, 2007

(65) Prior Publication Data

US 2008/0198401 A1 Aug. 21, 2008

(30) Foreign Application Priority Data

Feb. 21, 2007 (JP) ................................. 2007-040564

(51) Int. Cl.
*G06F 15/00* (2006.01)
*G03G 15/00* (2006.01)
(52) U.S. Cl. ........................................ 358/1.14; 399/45
(58) Field of Classification Search .................. 358/1.14, 358/1.13, 1.15, 1.9, 1.16, 1.18, 501, 444, 358/296, 400; 399/30, 45, 82, 60, 388, 382, 399/81; 271/201, 186, 298, 3.19; 270/58.08, 270/58, 7, 58.02
See application file for complete search history.

(56) References Cited

U.S. PATENT DOCUMENTS

2006/0238786 A1* 10/2006 Sakura et al. .................. 358/1.9
2007/0002352 A1 1/2007 Ushio et al.

FOREIGN PATENT DOCUMENTS

| JP | 04-142993 A | 5/1992 |
|---|---|---|
| JP | 2004-287411 A | 10/2004 |
| JP | 2006-146941 A | 6/2006 |
| JP | 2007-8124 A | 1/2007 |

OTHER PUBLICATIONS

Japanese Office Action dated Mar. 17, 2009 (2 pages), and English translation thereof (3 pages), issued in counterpart Japanese Application Serial No. 2007-040564.

* cited by examiner

*Primary Examiner* — Saeid Ebrahimi Dehkordy
(74) *Attorney, Agent, or Firm* — Holtz, Holtz, Goodman & Chick, PC

(57) ABSTRACT

An image forming apparatus includes: an image forming section for forming images on papers based on image data of a document having a plurality of document pages and an additional image which is previously set; a post-processing device for carrying out a post-processing for the papers; a first input section for inputting and setting a division of the post-processing of the document pages; a second input section for setting the additional image so as to be formed on a first document page of the plurality of document pages; and a control section for causing the image forming section to form the additional image on the first document page of each division when the division of the post-processing of the document pages is set by the first input section and when the additional image is set by the second input section so as to be formed on the first document page of the plurality of document pages.

16 Claims, 20 Drawing Sheets

FIG.4

| PRINT SETTING | | | | | | | | |
|---|---|---|---|---|---|---|---|---|
| SETUP | PAGE UNIT SETTING | SPECIAL FUNCTION | FORM | WATERMARK | IMAGE QUALITY | FONT | VERSION | |

- TOP COVER
  - ○ BLANK PAPER   ○ PRINT
  - PAPER FEED TRAY  [TRAY 1 ▽]

- BACK COVER
  - ○ BLANK PAPER   ○ PRINT
  - PAPER FEED TRAY  [TRAY 1 ▽]

☑ PAGE UNIT SETTING

LIST NAME  [LIST 1 ▼]

- COVER SHEET
  - ☐ TOP COVER     [P1 TRAY ▽]
  - ☐ BACK COVER    [P1 TRAY ▽]

- ☐ CHAPTER DIVISION
  - PAGE NUMBER
  - EXAMPLE OF INPUT: 2,4,6 TO 10 (COMMA, HYPHEN)

SAVE/LOAD AUTHENTICATION...

MAIN CONTENTS VIEW...

A4
(210 × 297mm)

FORM

| IDENTIFICATION NUMBER | STAPLING | END OF STAPLING | HEADER CHARACTER POSITION |
|---|---|---|---|
| MAIN CONTENTS | ONE POSITION | | |
| 1-2 | SAME AS MAIN CONTENTS | NOT SPECIFIED | |
| 3 | SAME AS MAIN CONTENTS | SPECIFIED | |
| 4-5 | SAME AS MAIN CONTENTS | NOT SPECIFIED | |
| 6 | SAME AS MAIN CONTENTS | SPECIFIED | |

[LIST NAME EDITING...] [STAPLING SETTING...]

[ADD] [EDIT] [DELETE] [⇦] [⇨]  [INDEX PAPER SETTING...]

[OK] [CANCEL] [RETURN TO DEFAULT] [HELP]

FIG.8

| | | | |
|---|---|---|---|
| JOB DATA | | | |
| PAGE COMMON DATA | SET PRINT RUN | 1 | D1 |
| | OUTPUTTED PRINT RUN | 0 | D2 |
| | COPY MODE | ONE SURFACE → BOTH SURFACES | D3 |
| | POST-PROCESSING MODE | STAPLING AT ONE POSITION | D4 |
| | WATERMARK FORMATION | SPECIFIED | D5 |
| | WATERMARK ADDITION PAGE | ONLY FIRST PAGE | D5a |
| | ADDITION BOOKLET SETTING | 1 | D5b |
| | PRINT PAGE NUMBER | 1 | D6 |
| | DIVISION PAGE COUNTER | 1 | D7 |
| | THE NUMBER OF ALREADY-READ IMAGE(S) n | 16 | D8 |
| INDIVIDUAL PAGE DATA | PAGE 1 IMAGE STORAGE ADDRESS | 01**** | D11 |
| | STAPLING | SPECIFIED | D12 |
| | DIVISION | NOT SPECIFIED | D13 |
| | PAGE 2 IMAGE STORAGE ADDRESS | 02**** | |
| | STAPLING | SPECIFIED | |
| | DIVISION | NOT SPECIFIED | |
| | ... | ... | |
| | PAGE m IMAGE STORAGE ADDRESS | 0m**** | |
| | STAPLING | SPECIFIED | |
| | DIVISION | SPECIFIED | |

131, 131a (page common data), 131b (individual page data)

IMAGE FORMING APPARATUS AND IMAGE FORMING SYSTEM

BACKGROUND OF THE INVENTION

1. Field of the Invention

The present invention relates to an image forming apparatus comprising an image forming section for forming a document image on a paper and a post-processing device for carrying out a post-processing for the paper on which the document image is formed. The present invention also relates to an image forming system in which the image forming apparatus is connected to an operation apparatus for operating the image forming apparatus, so as to be communicable with each other.

2. Description of Related Art

Recently, such an image forming apparatus comprising an image forming section for forming a document image on a paper and a post-processing device for carrying out a post-processing, such as punching processing, staple processing, folding processing, or the like for the paper on which the document image is formed, has been provided.

As an image forming apparatus, for example, Japanese Unexamined Patent Application No. H4-142993 discloses a copying apparatus comprising a page input unit for specifying an arbitrary page and a control section for controlling the apparatus so as to bind papers to the specified pages, in order to collectively carry out a binding processing for the bundles after all of a plurality of paper bundles are outputted.

Another image forming apparatus having a function such as a page number print processing or a layout processing in addition to a post-processing, such as, staple processing, folding processing function or the like, also has been disclosed. Such an image forming apparatus includes an image forming apparatus in which an image forming condition can be changed for a plurality of papers, a job, a plurality of pages, or a page.

For example, Japanese Unexamined Patent Application No. 2004-287411 discloses an image forming apparatus that divides a document having a plurality of pages to a plurality of groups so that an image forming is carried out for all of the groups based on image forming conditions set for each group. Japanese Unexamined Patent Application No. 2004-287411 also discloses an image forming apparatus in which the second image forming condition which is different from the first image forming condition is set for at least one of a layout processing, an information addition processing, or a post-processing of a predetermined page of the document having the plurality of pages so that an image is formed on the predetermined page based on the second image forming condition in addition to the first image forming condition regarding the entirety of a document of a plurality of pages.

However, in the case of the conventional image forming apparatus, when the image forming apparatus is set so as to add a previously-registered character image or a symbol mark image (hereinafter referred to as watermark) to only the first document page of a document composed of a plurality of document groups each of which has a plurality of document pages, a watermark is added only to the first document page of first document group. Specifically, in order to allow the conventional image forming apparatus to add watermarks to the first document pages of all of the document groups, the apparatus must be set for every document page or every document group. This is a troublesome and inconvenient operation for a user to perform the operation.

DISCLOSURE OF THE INVENTION

The present invention has been made in view of the above problem. An object of the invention is to provide an image forming apparatus and an image forming system which a user can conveniently use in the printing of a watermark.

In order to realize at least one of the above-described objects, in accordance with an embodiment according to an aspect of the present invention, an image forming apparatus, comprises:

an image forming section for forming images on papers based on image data of a document having a plurality of document pages and an additional image which is previously set;

a post-processing device for carrying out a post-processing for the papers;

a first input section for inputting and setting a division of the post-processing of the document pages;

a second input section for setting the additional image so as to be formed on a first document page of the plurality of document pages; and a control section for causing the image forming section to form the additional image on the first document page of each division when the division of the post-processing of the document pages is set by the first input section and when the additional image is set by the second input section so as to be formed on the first document page of the plurality of document pages.

In order to realize at least one of the above-described objects, in accordance with an embodiment according to an aspect of the present invention, an image forming apparatus, comprises:

an image forming section for forming images on papers based on image data of a document having a plurality of document pages and an additional image which is previously set;

a post-processing device for carrying out a post-processing for the papers;

a first input section for setting a booklet dividing mode in which papers for which the post-processing is carried out and papers for which the post-processing is not carried out are mixed in the papers on which the images are formed by the image forming section and for setting a division of the post-processing of the document pages;

a second input section for setting the additional image so as to be formed on a first document page of the plurality of document pages; and a control section for causing the image forming section to form the additional image on the first document page of each division when the booklet dividing mode is set by the first input section and when the additional image is set by the second input section so as to be formed on the first document page of the plurality of document pages.

In the image forming apparatus, preferably, the image forming apparatus comprises:

a third input section for inputting a setting for determining whether the additional image is formed only in a first division of a plurality of divisions of the document pages or not, wherein the control section controls the forming of the additional image in each division of the document pages based on the setting inputted by the third input section.

In the image forming apparatus, preferably, the post-processing is a staple processing for binding the plurality of papers on which the image is formed.

In the image forming apparatus, preferably, the image forming apparatus comprises:

a fourth input section for inputting and setting a selected type of the additional image.

In order to realize at least one of the above-described objects, in accordance with an embodiment according to an aspect of the present invention, an image forming system comprises:

an operation apparatus for transmitting image data of a document having a plurality of document pages, an instruction for forming an additional image which is previously set, on a paper on which an image is formed based on the image data, and an instruction for carrying out a post-processing for the paper; and an image forming apparatus comprising an image forming section for forming the image on the paper based on the image data received from the operation apparatus, and for forming the additional image on the paper in accordance with the instruction for forming the additional image which is previously on the paper; and a post-processing device for carrying out the post-processing for the papers, wherein the operation apparatus is connected to the image forming apparatus so as to be communicable with each other, wherein the operation apparatus comprises:

a first input section for inputting a setting of a division of the document pages for which the post-processing is carried out; and a second input section for inputting a setting for forming the additional image on a first document page of the plurality of document pages, and wherein the image forming apparatus comprises:

a control section for causing the image forming section to form the additional image on the first document page of each division when the division of the document pages for which the post-processing is carried out is set by the first input section and when the setting for forming the additional image on the first document page of the plurality of document pages is inputted by the second input section.

In order to realize at least one of the above-described objectives, in accordance with an embodiment according to an aspect of the present invention, an image forming system comprises:

an operation apparatus for transmitting image data of a document having a plurality of document pages, an instruction for forming an additional image which is previously set, on a paper on which an image is formed based on the image data, and an instruction for carrying out a post-processing for the paper; and an image forming apparatus comprising an image forming section for forming the image on the paper based on the image data received from the operation apparatus, and for forming the additional image on the paper in accordance with the instruction for forming the additional image which is previously on the paper; and a post-processing device for carrying out the post-processing for the papers, wherein the operation apparatus is connected to the image forming apparatus so as to be communicable with each other, wherein the operation apparatus comprises:

a first input section for inputting a setting of a booklet dividing mode in which papers for which the post-processing is carried out and papers for which the post-processing is not carried out are mixed in the papers on which the images are formed by the image forming section, and a setting a division of the document pages for which the post-processing is carried out; and a second input section for inputting a setting for forming the additional image on a first document page of the plurality of document pages, and the image forming apparatus comprises:

a control section for causing the image forming section to form the additional image on the first document pages of each division when the booklet dividing mode is set by the first input section and when the setting for forming the additional image on the first document page of the plurality of document pages is inputted by the second input section.

In the image forming system, preferably, the operation apparatus comprises:

a third input section for inputting a setting for determining whether the additional image is formed only in a first division of a plurality of divisions of the document pages or not, and the control section controls the forming of the additional image in each division of the document pages based on the setting inputted by the third input section.

In the image forming system, preferably, the post-processing is a staple processing for binding a plurality of papers on which the images are formed.

In the image forming system, preferably, the operation apparatus comprises a fourth input section for inputting and setting a selected type of the additional image.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 4 illustrates an example of a page unit setting screen.

FIG. 8 illustrates an example of job data.

DETAILED DESCRIPTION OF PREFERRED EMBODIMENT

Hereinafter, an embodiment of the present invention will be described with reference to the drawings.

First, the structure will be described.

Figure 1:
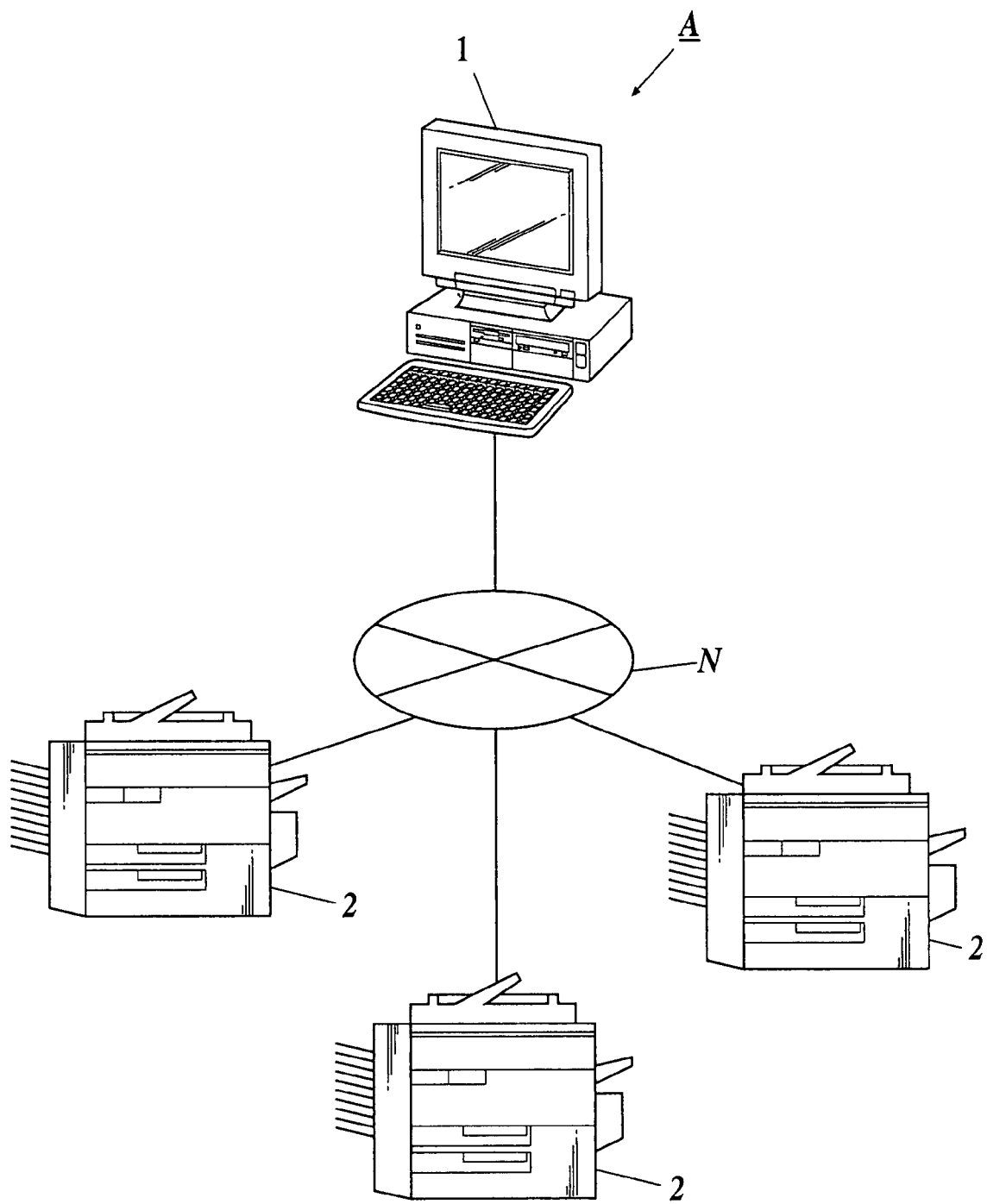
FIG. 1 illustrates a structure of an image forming system in this embodiment.

FIG. 1 shows the structure of an image forming system A in this embodiment.

As shown in FIG. 1, the image forming system A comprises an operation apparatus 1 and an image forming apparatus 2. Each apparatus is communicably connected via a network N. Although FIG. 1 shows an example in which one operation apparatus 1 is connected to three image forming apparatuses 2, the number of the respective apparatuses are not particularly limited.

A purpose of the operation apparatus 1 is to remotely operate the image forming apparatus 2. When the image forming apparatus 2 is remotely controlled by the operation apparatus 1 to cause the image forming apparatus 2 to perform a print processing for example, the operation apparatus 1 transmits various setting conditions and various image data set for the print processing to the image forming apparatus 2. As the operation apparatus 1, for example, an information processing apparatus such as a general-purpose personal computer can be applied.

The image forming apparatus 2 has an image forming function for forming an image on a paper and a post-processing function for carrying out a post-processing, such as punching processing, staple processing, folding processing, cutting processing, or the like for a paper on which an image is formed. The image forming apparatus 2 performs the processings based on a setting instruction from an operation section provided in the apparatus or various setting instructions transmitted from the operation apparatus 1.

The network N may be a Local Area Network (LAN) or a Wide Area Network (WAN). Alternatively, the network N also may be structured by a telephone line network, an Integrated Services Digital Network (ISDN) line network, a broadband communication line network, an exclusive line, a mobile communication network, a communication satellite line, a Community Antenna Television (CATV) line, an optical communication line, or a wireless communication line or the like and the Internet service provider for connecting the network or line.

First, the operation apparatus 1 will be described.

Figure 2:
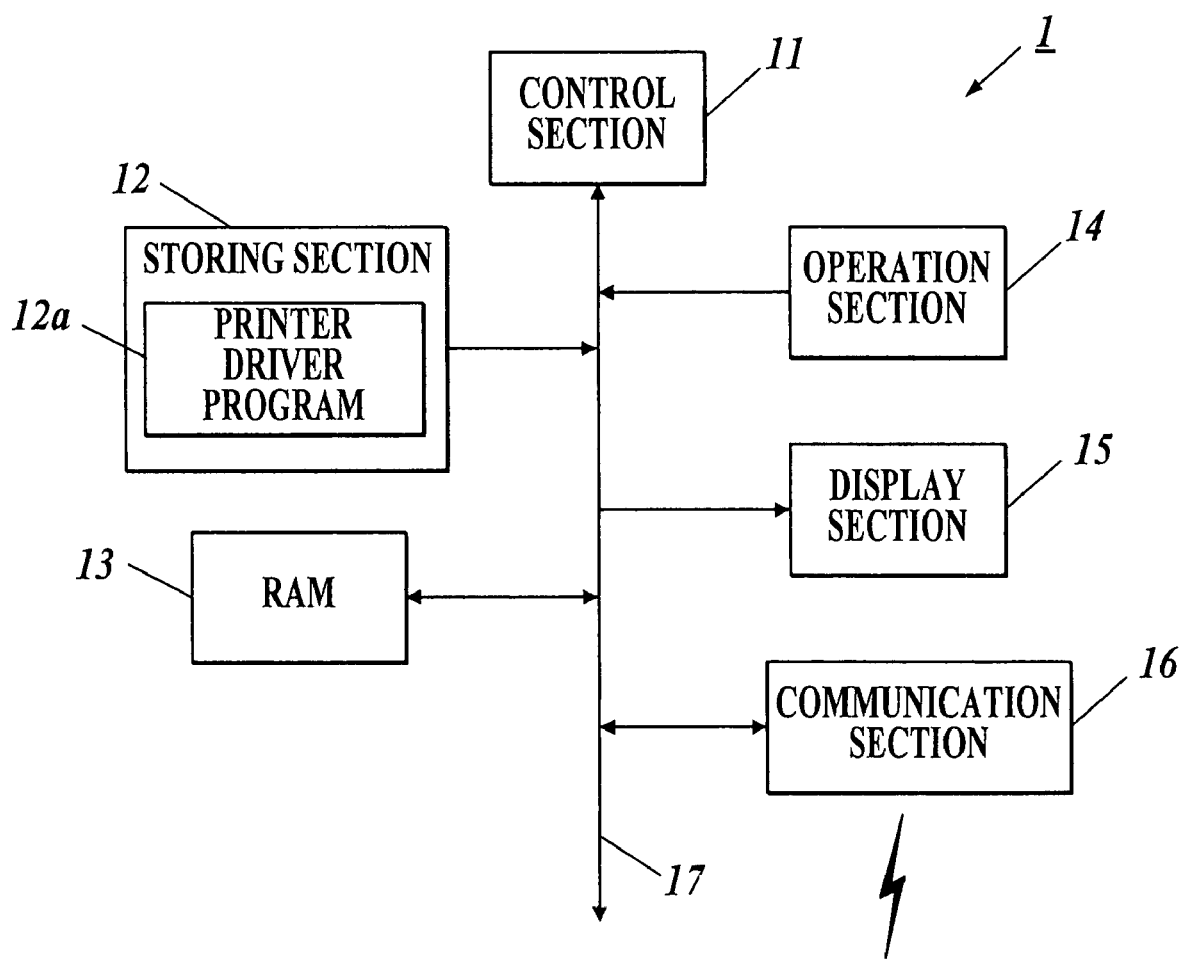
FIG. 2 illustrates an internal structure of an operation apparatus.

FIG. 2 illustrates an internal structure of the operation apparatus 1.

As shown in FIG. 2, the operation apparatus 1 comprises a control section 11, a storing section 12, a Random Access Memory (RAM) 13, an operation section 14, a display section 15, a communication section 16 and the like. Each section is connected so as to have communication to one another via a bus 17 for example.

The control section 11 comprises a Central Processing Section (CPU) for example. The control section 11 expands system programs, various control programs, and various data and the like stored in the storing section 12 to the RAM 13 so that the entire operation of the operation apparatus 1 is controlled in an integrated manner by the cooperation of these programs and data. Based on the programs expanded to the RAM 13, the control section 11 executes various processings to store the processing result in the RAM 13 and to cause the display section 15 to display the processing result. Then, the processing result stored in the RAM 13 is stored in a predetermined storage location of the storing section 12.

The control section 11 also executes an application software program stored in the storing section 12, a printer driver program 12a for executing a printer driver, and a print control processing and the like by the cooperation of various data to store the processing result in the RAM 13 and to cause the display section 15 to display the processing result.

The storing section 12 comprises a non-volatile storage medium, such as Read Only Memory (ROM), Hard Disk Drive (HDD) or the like. This storage medium stores therein a system program, various control programs, various application programs and the printer driver program 12a which are executed by the control section 11, and data for these programs and the like.

The RAM 13 forms a work area for temporarily storing various programs executed by the control section 11 and data for these programs.

The operation section 14 comprises: a keyboard including numeric keys, character keys, cursor move keys, and various function keys and the like for inputting an operation instruction to the operation apparatus 1 and the image forming apparatus 2; and a pointing device such as a mouse. The operation section 14 outputs a depression signal by a keyboard and an operation signal by a mouse as an input signal to the control section 11.

The display section 15 comprises a Liquid Crystal Display (LCD) or the like and displays various setting screens on a display screen based on a display signal inputted from the control section 11.

The communication section 16 comprises various interfaces, such as a network interface card (NIC), a modem (MOdulator-DEModulator), Universal Serial Bus (USB). The communication section 16 transmits or receives information to or from an external device on the network N.

Figure 3:
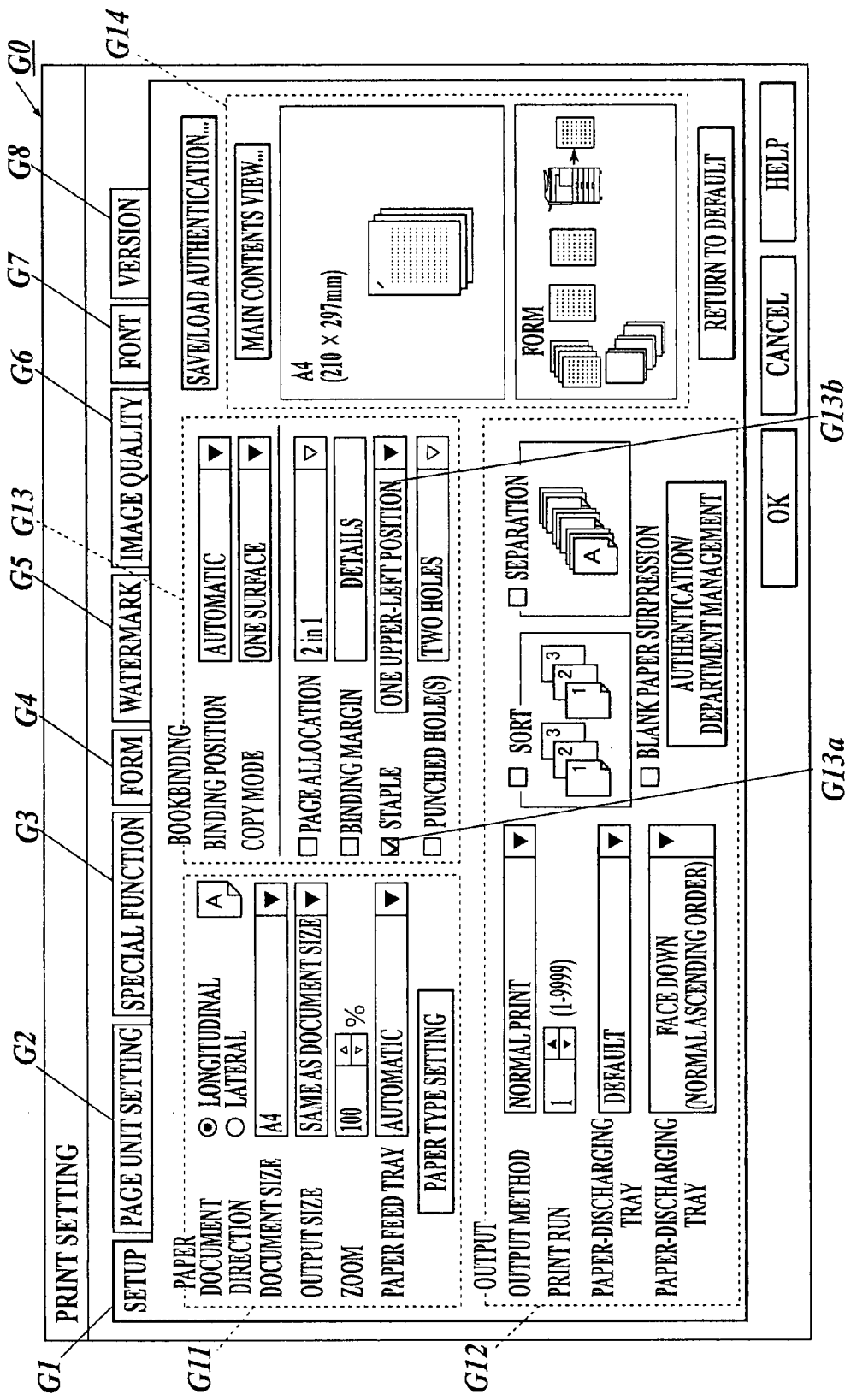
FIG. 3 illustrates an example of a setup screen.
Figure 5:
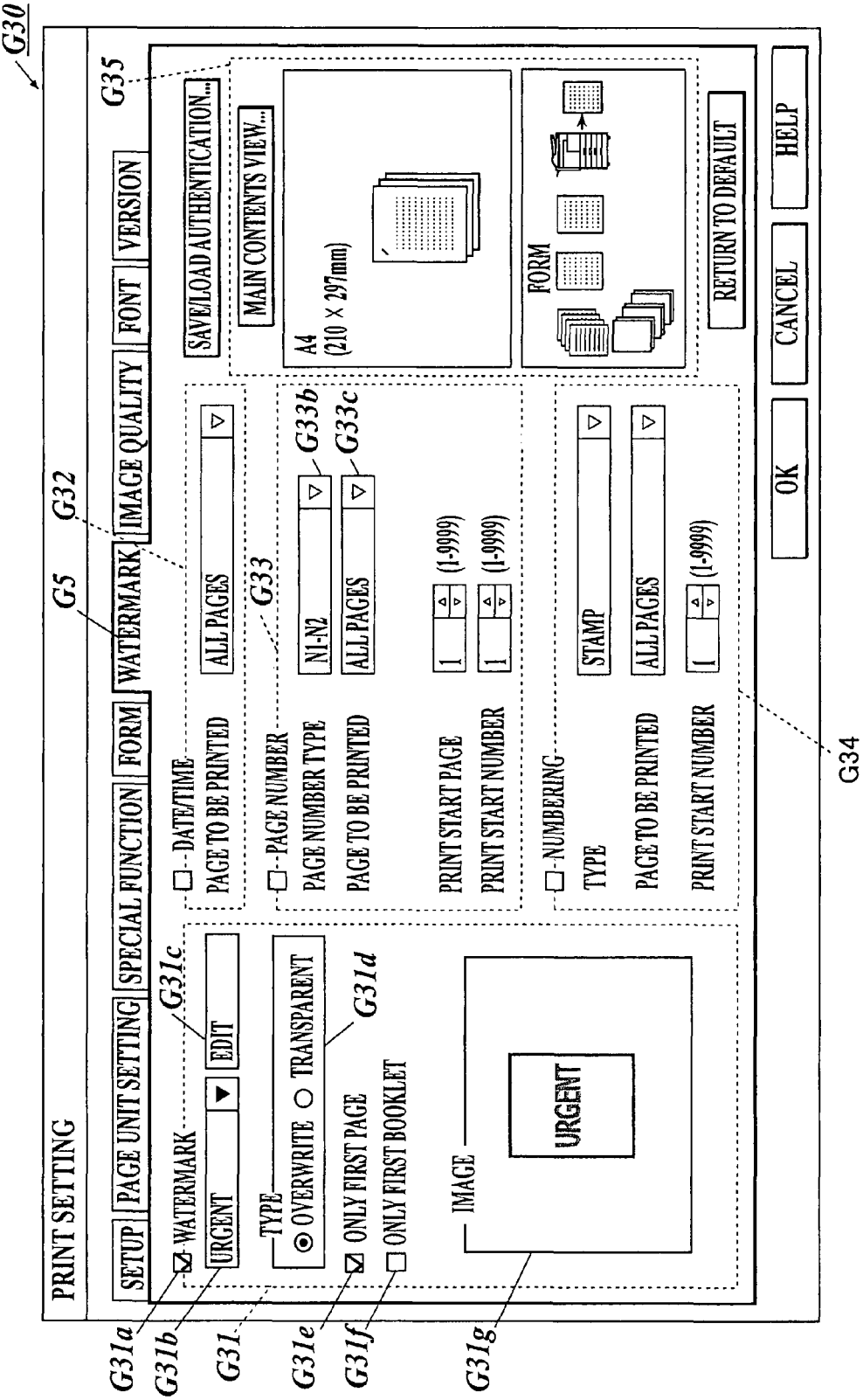
FIG. 5 illustrates an example of a watermark setting screen.

FIGS. 3 to 5 illustrate an example of various setting screens displayed on the display screen of the display section 15. The various setting screens are a screen for inputting and setting various setting conditions in a print processing when the print processing is executed by the image forming apparatus 2.

FIG. 3 illustrates an example of a setup screen G0. FIG. 4 illustrates an example of a page unit setting screen G20a. FIG. 5 illustrates an example of a watermark setting screen G30.

The setup screen G0 shown in FIG. 3 comprises: a setup index G1 including a paper setting area G11, an output setting area G12, a bookbinding setting area G13, and a preview area G14; a page unit setting index G2 for switching to a page unit setting screen; a special screen index G3 for switching to a special function setting screen; a form index G4 for switching to a form setting screen; a watermark index G5 for switching to a watermark setting screen; an image quality index G6 for switching to an image quality setting screen; a font index G7 for switching to a font setting screen; and a version index G8 for switching to a version check screen for displaying an updated version of a printer driver and the like.

The bookbinding setting area G13 comprises, for example: a binding position setting button for setting a binding position; a copy mode setting button for setting a copy mode; a page allocation setting section for setting whether a plurality of documents are collectively allocated to one page or not; a collective allocation number setting button for setting the number of documents to be collectively allocated when the page allocation setting section is checked; a binding margin setting section for setting whether a binding margin is arbitrarily set or not; a binding margin setting button for displaying a screen for setting detailed information for a binding margin, such as the width of a binding margin, image position and the like when the binding margin setting section is checked; a staple setting section G13a for setting whether a stapling operation is required or not; and a staple setting button G13b for setting the type of the staple when the staple setting section G13a is checked.

A page unit setting screen G20a shown in FIG. 4 displays a page unit setting index G2 including a top cover setting area G21, a back cover setting area G22, a page unit setting area G23, and a preview area G24 for example.

The page unit setting area G23 comprises, for example, a page unit setting section G23a for setting whether various setting conditions are set for each document page unit or not; a condition selection button G23b for setting various setting conditions desired by a user from among a plurality of various previously-determined setting conditions when the page unit setting section G23a is checked; and a list area G23c for displaying various setting conditions for each document page when the page unit setting section G23a is checked.

In this embodiment, by checking the page unit setting section G23a, a booklet dividing mode in which papers for which a post-processing is carried out and papers for which a post-processing is not carried out are mixed is set.

The list area G23c displays individual conditions so as to set an identification number for identifying a document page, the type of a post-processing corresponding to an identification number (in this case, the type of a post-processing indicates whether a stapling is required or not and a staple position), and a position at which the post-processing of a document page is ended or a division position (in this case, the position indicates a position at which a stapling is ended) for example. In this case, each condition is individually set for six document pages. For example, document pages having identification numbers of 1, 2, 4, and 5 are set so that stapling is performed at one position and a position at which a stapling is ended is not set. Document pages having identification numbers of 3 and 6 are set so that stapling is performed at one position and a position at which stapling is ended is set. Therefore, two bundles which are a bundle obtained by stapling papers on which images of document pages 1 to 3 are formed and a bundle obtained by stapling papers on which images of document pages 4 to 6 are formed, are obtained.

The individual conditions are not limited to the type of a post-processing or a division position and also may include a copy mode, a paper feed tray and the like.

The preview area G24 displays an image of a print of a document page selected through the list area G23c.

The watermark setting screen G30 shown in FIG. 5 comprises a watermark setting area G31, a date/time setting area G32, a page number setting area G33, a numbering setting area G34, and a preview area G35 for example.

The watermark setting area G31 comprises, for example, a watermark setting section G31a for setting whether a watermark as an additional image formed on a paper is added or not; a watermark selection button G31b for setting a previously-registered character image or symbol mark as a watermark to be formed on a paper; a watermark editing button G31c for newly preparing a watermark image or for editing a previously-registered character image or a symbol mark; a type selection button G31d for selecting whether an image to be formed as a watermark is combined with an image of a document page or is combined with an image of a document page so that the watermark image has a lower density than that of the image of the document page to allow the watermark image to be transparently seen through the image of the document page; an additional page setting section G31e for selecting whether a watermark is added to the first document page (the first page) or not; an addition booklet setting section G31f for selecting whether a watermark is formed only at the first booklet or not; and an image display area G31g for displaying an image of a watermark to be formed.

Specifically, a watermark is an image obtained by the combination in which a character image or a symbol mark is overwritten on a document page image when the watermark is formed or the combination in which the watermark is formed with a lower density than that of the document page image so that the document page image can be transparently seen through the watermark. Depending on the combinations, a plurality of types of watermarks exist.

In the present invention, the first input section for inputting and setting a division of a post-processing of the document pages corresponds to the page unit setting area G23. The second input section for setting a watermark as an additional image so as to be formed on the first document page of a plurality of document pages corresponds to the additional page setting section G31e. The fourth input section for inputting and setting the selected type of a watermark as an additional image corresponds to the watermark selection button G31b, the watermark editing button G31c, and the type selection button G31d. The third input section for inputting a setting for determining whether a watermark as an additional image is formed only in the first division of a plurality of divisions of the document pages corresponds to the addition booklet setting section G31f.

Next, the image forming apparatus 2 will be described.

Figure 6:
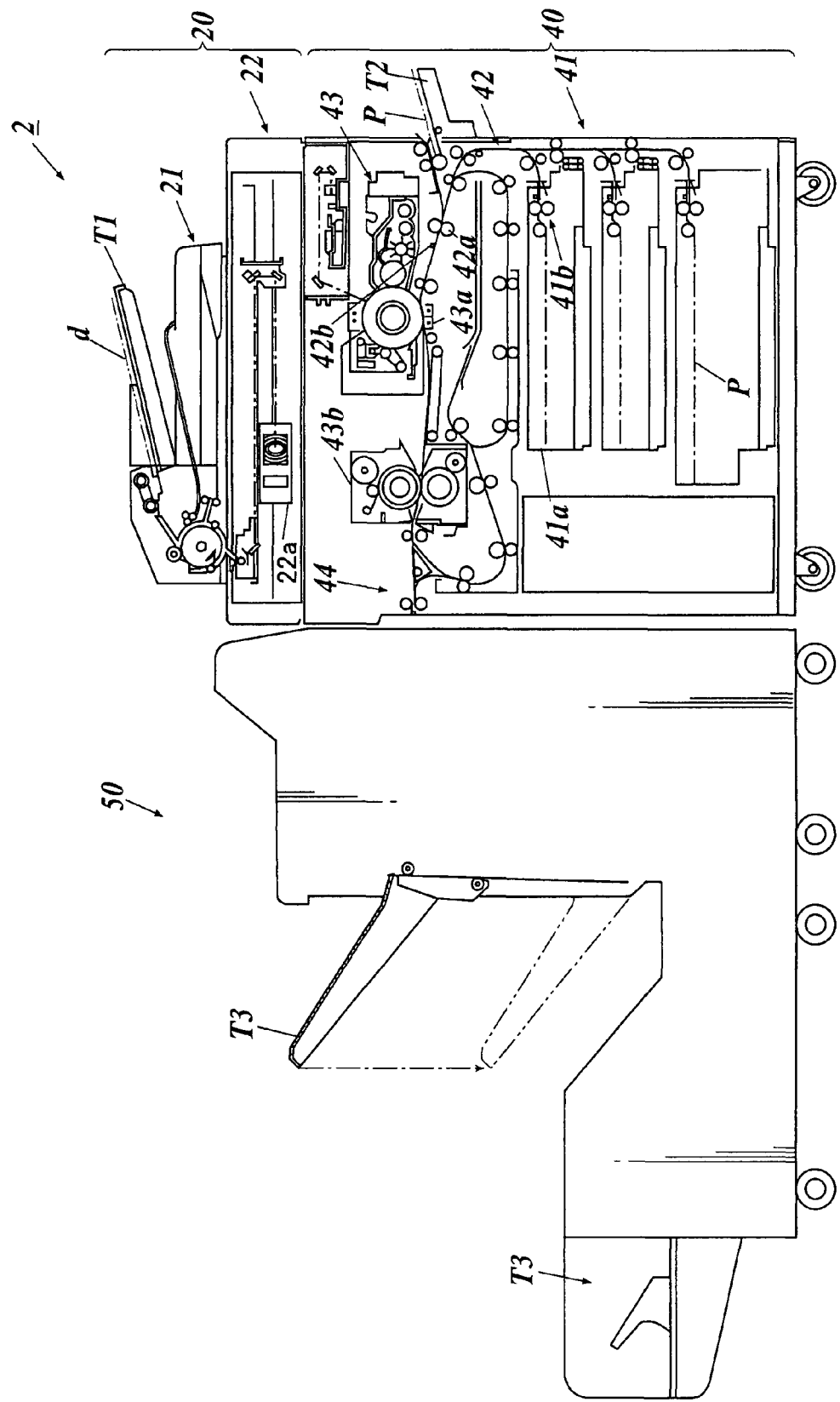
FIG. 6 is a schematic cross sectional view illustrating an image forming apparatus.

FIG. 6 is a schematic cross-sectional view illustrating the image forming apparatus 2.

The image forming apparatus 2 is a digital complex machine comprising, for example, an image forming section for reading an image on a document to form the read image on a paper P and for receiving image data from the operation apparatus 1 for example to form the image on the paper P based on the image data; and a post-processing device for carrying out a punching processing, a staple processing, a folding processing, a cutting processing or the like for the paper on which an image is formed. As shown in FIG. 6, the image forming apparatus 2 comprises an image reader 20, a printer 40, and a post-processing device 50.

The image reader 20 comprises an automatic paper feeder 21 called as an Auto Document Feeder (ADF) and a reader 22. A document "d" placed in a paper tray T1 of the automatic paper feeder 21 is transmitted to a contact glass at which the document d is read by the reader 22. Then, an image on one surface or images on both surfaces of the document "d" is/are read by the optical system of the reader 22 and the image(s) of the document "d" is/are read by a Charge Coupled Device (CCD) 22a. The term "image" herein includes not only image data, such as graphics, photograph or the like but also text data, such as character, symbol, or the like.

The image read by the reader 22 (analog image signal) is outputted to an image control section (which will be described later), and is outputted to the printer 40 after an A/D conversion and various image processings are carried out by the image control section.

Based on the inputted print data, the printer 40 performs an electrophotographic image forming processing. The printer 40 comprises a paper feed section 41, a paper conveying section 42, an image forming section 43, and a discharge section 44.

The paper feed section 41 comprises a plurality of paper feed cassettes 41a, a paper feed unit 41b, and a manual paper feed tray T2 and the like. The paper feed cassettes 41a store different types of papers P which are previously identified based on the sizes and types in each paper feed cassette 41a. The papers P are conveyed one by one from the top by the paper feed unit 41b to the paper conveying section 42. The manual paper feed tray T2 can store therein various types of papers P depending on the need of a user and stored papers P are conveyed by a paper feed roller one by one from the top to the paper conveying section 42.

The paper P conveyed from the paper feed cassette 41a or the manual paper feed tray T2 is conveyed by the paper conveying section 42 to a transfer device 43a via a plurality of intermediate rollers and a resist roller 42a and the like.

The paper conveying section 42 also conveys the paper P in which an image is already formed on one surface to a both surfaces conveying path by a conveying path switching plate to convey the paper P to the transfer device 43a via the intermediate roller and the resist roller 42a again.

The image forming section 43 comprises: an exposure device comprising a photoconductor drum, a charging device, a laser output section for outputting laser light based on image data, and a polygon mirror for scanning laser light in a main scanning direction; a development device; a transfer device 43a; a cleaning section; and a fixing device 43b. Specifically, laser light is irradiated by the exposure device to the photoconductor drum changed by the charging device to form an electrostatic latent image. The development device attracts charged toner to the photoconductor drum on which the electrostatic latent image is formed to develop the electrostatic latent image. A toner image formed on the photoconductor drum by the development device is transferred to the paper P by the transfer device 43a. After the toner image is transferred to the paper P, residual toner on the surface of the photoconductor drum and the like is removed by the cleaning section.

The fixing device 43b heats and fixes the toner image transferred on the paper P conveyed by the paper conveying section 42. The paper P for which the fixing processing is carried out is sandwiched by paper discharging rollers of the discharge section 44 and is conveyed from a discharging outlet to the post-processing device 50.

The post-processing device 50 comprises, for example, a sorter for sorting papers on which images are formed, a punching unit for performing a punching processing, a staple unit for carrying out a staple processing for a bundle of papers, a folding unit for performing a folding processing, and a cutting unit for performing a cutting processing. A paper for which various processings are carried out or a paper for which various processings are not carried out is discharged to the paper discharging tray T3.

Figure 7:
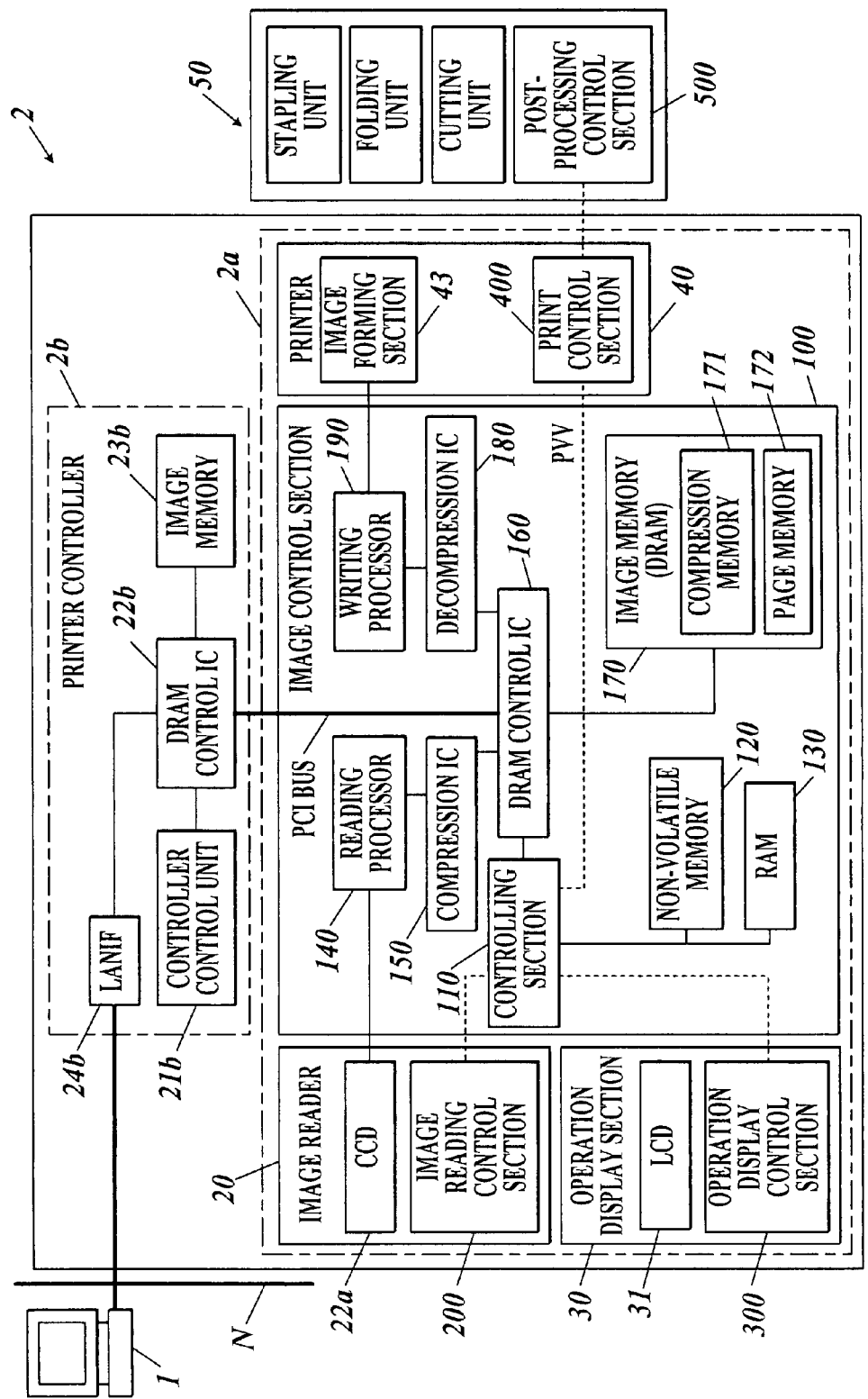
FIG. 7 is a control block diagram of the image forming apparatus.

FIG. 7 is a control block diagram of the image forming apparatus 2.

As shown in FIG. 7, the image forming apparatus 2 comprises: a body part 2a; a printer controller 2b; and a post-processing device 50 connected to the body part 2a. The image forming apparatus 2 is connected to the operation apparatus 1 on the network N via a Local Area Network Interface (LANIF) 24b of the printer controller 2b so as to receive and transmit information to each other.

The body part 2a comprises the image reader 20, the operation display section 30, the printer 40, and the body control section 100. The same components as those described with reference to FIG. 6 are denoted with the same reference numerals and will not be described further.

The body control section 100 comprises: a control section 110, a non-volatile memory 120, a Random Access Memory (RAM) 130, a reading processor 140, a compression IC 150, a Dynamic Random Access Memory (DRAM) control IC 160, an image memory 170, a decompression IC 180, and a writing processor 190.

The control section 110 comprises a Central Processing Unit (CPU) and the like and controls each operation of the sections of the image forming apparatus 2 in an integrated manner in accordance with various processing programs stored in the non-volatile memory 120. For example, the control section 110 switches to switch a copy mode, a printer mode, and a scanner mode based on an instruction signal inputted from the operation display section 30 or the operation apparatus 1, to control a copying, print, or image data reading operation and the like.

The control section 110 also transmits an image writing signal PVV to the print control section 400 of the printer 40. It is assumed that when the image writing signal PVV is in an ON status, a toner image formed on a photoconductor drum can be transferred to the paper P by the transfer device 43a and that when the image writing signal PVV is in an OFF status, the toner image formed on the photoconductor drum cannot be transferred to the paper P by the transfer device 43a.

In order to realize this embodiment, the control section 110 reads out a watermark setting program according to this embodiment from the non-volatile memory 120 and job data from the RAM 130. Then, by the cooperation of the program and the data, the setting of a watermark formed on a paper is controlled. When a division of a post-processing of the document pages is set by the operation display section 30 or the operation apparatus 1 and the setting for instructing that a watermark is formed on the first document page (the first page) of a plurality of document pages is carried out, the control section 110 controls the apparatus so as to form a watermark on the first document page (the first page) in each division.

For example, when a setting for forming a watermark on the first pages in each division is carried out, the page unit setting section G23a is checked, staple end positions are specified in the list area G23c, the watermark setting section G31a is checked, and the additional page setting section G31e is checked.

When an instruction for specifying a booklet dividing mode is inputted from the operation display section 30 or the operation apparatus 1 and the setting for forming a watermark as an additional image on the first document page (the first page) of a plurality of document pages is carried out, that is, in this embodiment when the page unit setting section G23a is checked, the watermark setting section G31a is checked, and the additional page setting section G31e is checked, the control section 110 may control the apparatus so as to form a watermark on the first page in each division of document pages.

The non-volatile memory 120 stores therein various processing programs and data for image forming, a watermark setting program, a previously-registered image as a watermark, data for setting a post-processing for the paper P on which an image is formed to the post-processing device 50 via the printer 40, and data processed by various programs and the like according to this embodiment.

The RAM 130 forms a work area that temporarily stores therein various programs executed by the control section 110 and data for these programs, and job data and the like.

FIG. 8 illustrates an example of job data.

As shown in FIG. 8, the job data 131 includes: data common to the document pages (page common data 131a); and data for each document page (each page data 131b).

The page common data 131a includes various setting conditions set based on an instruction signal inputted from the operation apparatus 1 or the operation display section 30 and data showing an operation status of an image forming operation and a post-processing operation.

For example, the page common data 131a may include: a set print run D1 showing the number of the papers P to be outputted; an outputted print run D2 showing the counter number of outputted papers; a copy mode D3 showing a surface on which image data is formed, that is, printing from one surface to both surface print, printing from both surfaces to one surface print and the like; a post-processing mode D4 showing the type of a set post-processing (e.g., whether a stapling is required or not, a staple position); a watermark formation D5 showing whether a watermark is formed or not (i.e., whether the watermark setting section G31*a* is checked or not); a watermark addition page D5*a* showing whether watermark(s) should be formed on the first page or all pages (i.e., whether the additional page setting section G31*e* is checked or not) when the watermark formation D5 is specified; an addition booklet setting D5*b* showing whether the watermark formation D5 is specified and a watermark should be formed only in the first division of a plurality of divisions of document pages or watermarks should be formed in all of the divisions (e.g., when the addition booklet setting section G31*f* is checked, the number "0" for indicating that a watermark is formed only at a booklet formed by the first division is shown, and when the addition booklet setting section G31*f* is not checked, the number "1" for indicating that watermarks are formed at all booklets formed by all divisions is shown); a print page number D6 showing an identification number of individual image data corresponding to a document page for which an image forming processing is carried out; a division page counter D7 for counting a page number of a paper in each division of document pages; and the number of already-read images D8 showing the total number "n" of read individual image data, and the like.

Each page data is obtained by adding an identification number (e.g., page 1, page 2 . . . ) to individual image data corresponding to each read document page and is individually stored. Each individual image data includes: an image storage address D11 showing an address on the image memory 170 at which the individual image data is stored; a post-processing information D12 showing a post-processing for each individual image data set by the list area G23*c* (in this case, whether a stapling is required or not); and a division information D13 showing a division position of individual image data (in this case, whether a staple end position is specified or not) and the like.

The reading processor 140 carries out various processings such as, analog processing, A/D conversion processing, shading processing or the like for an analog image signal inputted from the reading control section 200 of the image reader 20, and generates digital image data. The generated image data is outputted to the compression IC 150.

The compression IC 150 carries out a compression processing for the inputted digital image data to output the data to a DRAM control IC 160.

The DRAM control IC 160 controls a compression processing of image data by the compression IC 150 and a decompression processing of compressed image data by the decompression IC180 based on the instruction from the control section 110 and controls an input and an output of image data to and from the image memory 170. For example, when the storage of an image signal read by the image reader 20 is instructed, the DRAM control IC 160 causes the compression IC 150 to execute a compression processing of the image data inputted from the reading processor 140 to store the compressed image data in the compression memory 171 of the image memory 170. When a print output of compressed image data stored in the compression memory 171 is instructed, the DRAM control IC 160 reads out the compressed image data from the compression memory 171 to carry out a decompression processing for the data by the decompression IC 180 to store the data in the page memory 172. When a print output of the image data stored in the page memory 172 is instructed, the DRAM control IC 160 reads out the image data from the page memory 172 to output the data to the writing processor 190.

The image memory 170 comprises a compression memory 171 composed of a Dynamic RAM (DRAM) and a page memory 172. The compression memory 171 is a memory for storing compressed image data. The page memory 172 is a memory for temporarily storing image data for a print output.

The decompression IC180 carries out a decompression processing for the inputted compressed image data.

The writing processor 190 generates print data for an image forming based on the image data inputted from the DRAM control IC 160 to output the data to the printer 40.

The image reader 20 comprises, for example, a CCD 22*a*, an image reading control section 200, and the automatic paper feeder 21 and the reader 22 shown in FIG. 6 and not shown here. The image reading control section 200 controls the automatic paper feeder 21, the reader 22 and the like to execute exposure and scanning of a document surface to carry out photoelectric conversion for reflected light by the CCD 22*a*. Therefore, an image is read. The read analog image signal is outputted to the reading processor 140.

The operation display section 30 comprises: a Liquid Crystal Display (LCD) 31, an operation display control section 300, and an operation key group which is not shown. On the LCD 31, a touch panel is provided so as to cover the LCD 31. The operation display control section 300 causes the LCD 31 to display a various setting screen for inputting various setting conditions or various processing results and the like based on the display signal inputted from the control section 110. The operation display control section 300 also outputs an operation signal inputted from the operation key group or touch panel to the control section 110.

The LCD 31 of the operation display section 30 also displays various setting screens as shown in FIGS. 3 to 5. The setting screen includes: the first input section for inputting and setting a division of document pages for which a post-processing is carried out; the second input section for inputting the setting for forming a watermark as an additional image on the first document page of a plurality of document pages; the fourth input section for selecting and setting the type of a watermark as an additional image; and the third input section for inputting the setting for determining whether a watermark as an additional image is formed only in the first division of a plurality of divisions of document pages.

The printer 40 comprises each section relating to print out, such as the image forming section 43 shown in FIG. 6 and the print control section 400. The print control section 400 controls each operation of the sections of the printer 40, such as the image forming section 43 and the like based on an instruction from the control section 110 to form an image on the paper P based on print data inputted from the writing processor 190 and outputs an instruction signal for operating each section of the post-processing device 50 to the post-processing control section 500 based on an instruction from the control section 110.

Next, each unit of the print controller 2*b* will be described. The print controller 2*b* manages and controls a job inputted from the operation apparatus 1 connected to the network N to the image forming apparatus 2 when the image forming apparatus 2 is used as a network printer. The print controller 2*b* receives print data from the operation apparatus 2 to transmit the data as a job to the body part 2*a*.

The printer controller 2b comprises a controller control section 21b, a DRAM control IC 22b, an image memory 23b, and a LANIF 24b.

The controller control section 21b controls each operation of the units of the print controller 2b in an integrated manner and transmits data inputted from the operation apparatus 1 as a job to the body part 2a via the LANIF 24b.

The DRAM control IC 22b controls the storage of data received by the LANIF 24b into the mage memory 23b and the reading of the data from the image memory 23b. The DRAM control IC 22b is connected to the DRAM control IC 160 of the body control section 100 via a Peripheral Components Interconnect (PCI) bus and reads out print data from the image memory 23b to output the data to the DRAM control IC 160 in accordance with an instruction from the controller control section 21b.

The image memory 23b comprises a DRAM and temporarily stores inputted output data.

The LANIF 24b is a communication interface, such as, Network Interface Card (NIC) and modem, for the connection to the network N such as LAN, and receives data from the operation apparatus 1. The received data is outputted to the DRAM control IC 22b.

The post-processing device 50 comprises various post-processing units, such as sorting unit, punching unit, staple unit, folding unit and cutting unit, and a convey unit, such as a conveying roller, for conveying a paper to various post-processing units. Various post-processing units are controlled by the post-processing control section 500 in an integrated manner. The post-processing control section 500 controls the apparatus so that the paper P is conveyed along a conveying path to a predetermined processing unit, the predetermined post-processing is carried out for the paper P by controlling the operation of each unit and the paper P is discharged to a predetermined discharge tray in accordance with a post-processing instruction signal inputted from the control section 110 via the print control section 400.

Next, the operation of this embodiment will be described.

Figure 9:
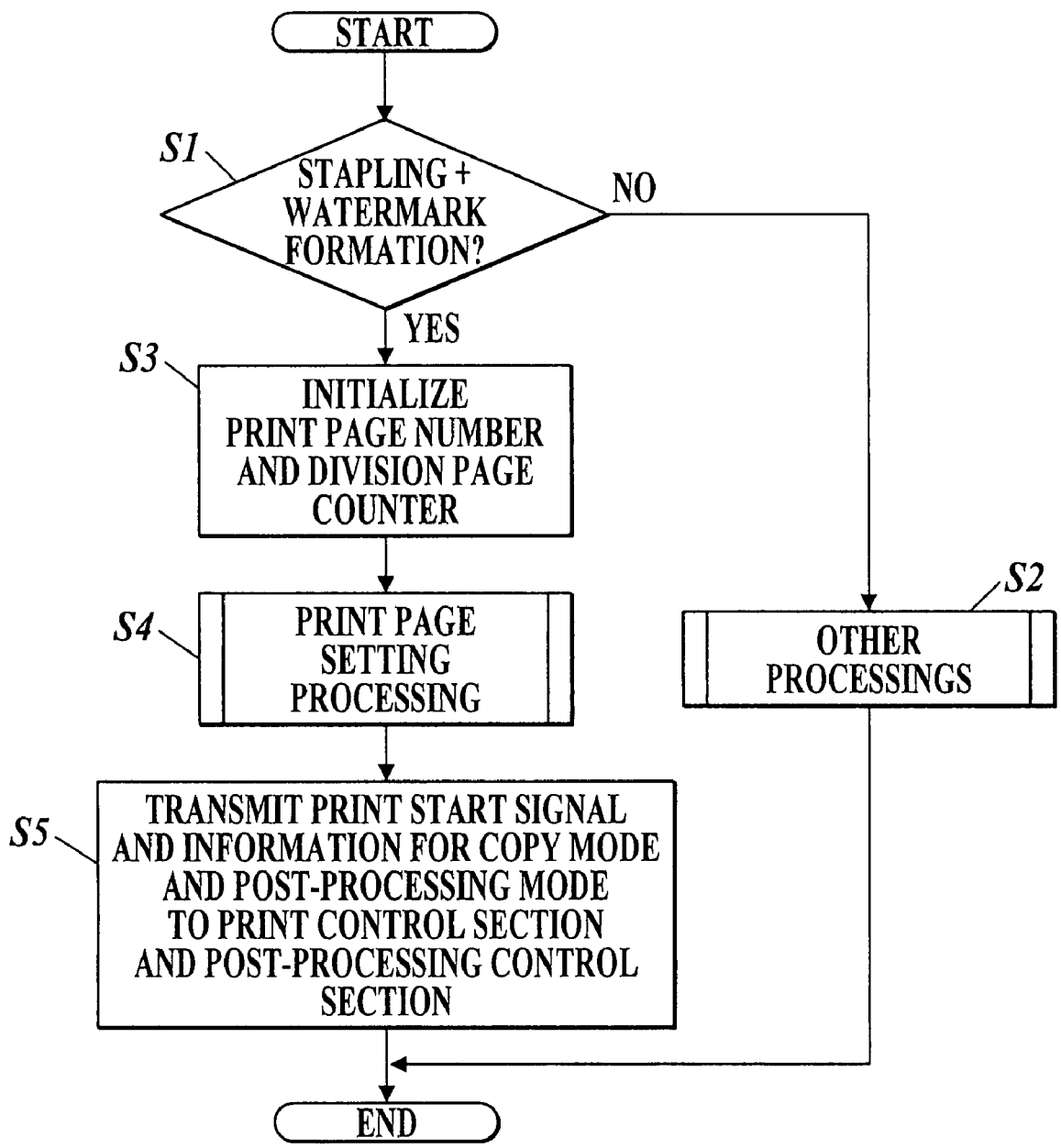
FIG. 9 is a flowchart illustrating a processing executed when an image forming processing is started.
Figure 10:
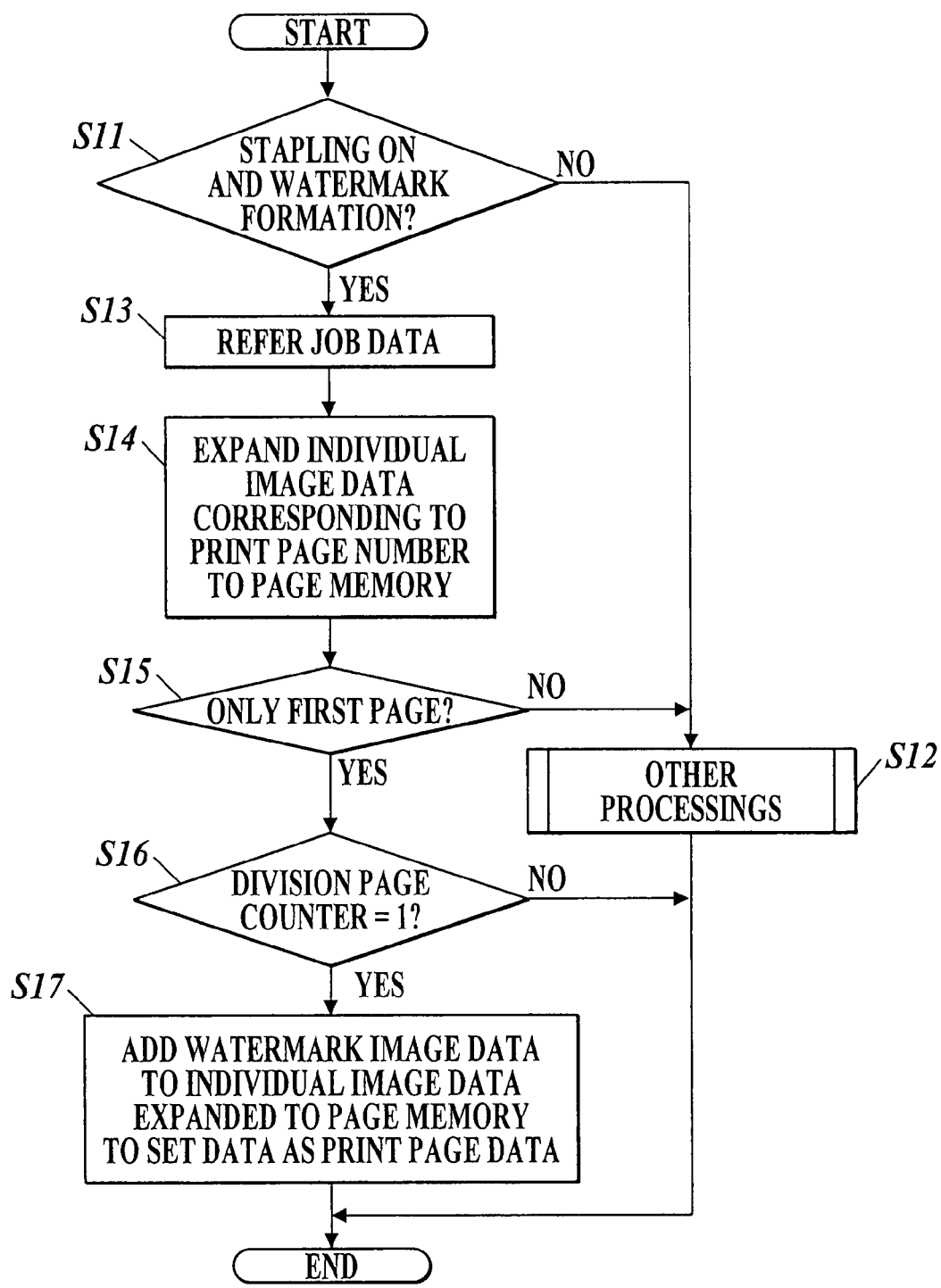
FIG. 10 is a flowchart of a print page setting processing.
Figure 11:
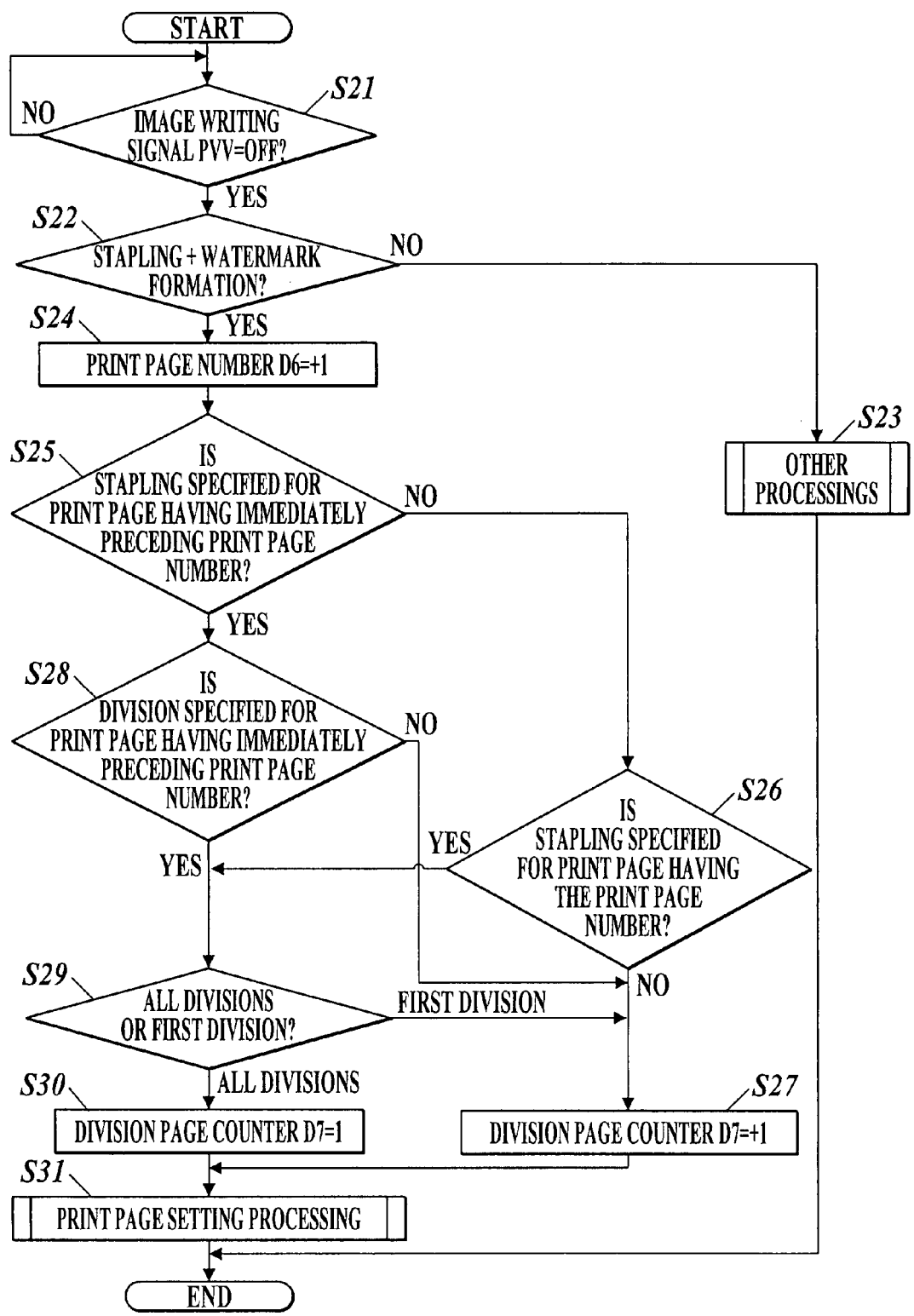
FIG. 11 is a flowchart of a processing executed when an image writing signal is switched from an ON status to an OFF status after the start of the image forming processing.

FIGS. 9 to 11 show a flowchart of a page number setting processing in this embodiment. The flowcharts shown in FIGS. 9 to 11 show a processing executed by the control section 110.

The flowchart shown in FIG. 9 shows a processing executed at the start of an image forming.

First, when various setting conditions and image data are inputted from the operation apparatus 1 or the operation display section 30 prior to the start of an image forming, the control section 110 stores the inputted various setting conditions and image data as job data in the RAM 130 and refers the job data to determine whether the post-processing mode D4 and the watermark formation D5 are both set or not (i.e., whether stapling and watermark formation are set or not) (Step S1).

When neither the post-processing mode D4 nor the watermark formation D5 is set (Step S1; No), the control section 110 executes other processings, such as various processings corresponding to no watermark formation (Step S2).

When the post-processing mode D4 and the watermark formation D5 are both set (Step S1; Yes), the control section 110 initializes the print page number D6 of the job data and the division page counter D7 (i.e., set the print page number D6 of the job data and the division page counter D7 to "1") (Step S3).

After Step S3, the control section 110 executes a print page setting processing for generating print data to be formed on a paper (Step S4).

After the print page setting processing (after Step S4), the control section 110 transmits a print start signal, a copy mode D3 and a post-processing mode D4 of the job data to the print control section 400 and the post-processing control section 500 (Step S5).

After Step S5, the control section 110 completes this processing.

FIG. 10 shows a flowchart of the print page setting processing executed by Step S4 of FIG. 9. The print page setting processing is a processing for generating and setting print page data in accordance with job data specifying individual image data corresponding to each document page.

The control section 110 refers the job data to determine whether the post-processing mode D4 and the watermark formation D5 are both set or not (i.e., whether stapling and watermark formation are set or not) (Step S11). When neither the post-processing mode D4 nor the watermark formation D5 is set (Step S11; No), other processings (Step S12) are executed.

When the post-processing mode D4 and the watermark formation D5 are both set (Step S11; Yes), the control section 110 refers the job data (Step S13) to expand individual image data stored at the image storage address D11 corresponding to the identification number of the document page shown by the print page number D6 to the page memory 172 (Step S14).

After the individual image data is expanded to the page memory 172, the control section 110 determines whether the watermark addition page D5a is set only to the first page or not (Step S15). When the watermark addition page D5a is not set only to the first page (Step S15; No), the control section 110 sets the individual image data expanded to the page memory 172 as print page data. Then, this processing is ended.

When the watermark addition page D5a is set only to the first page (Step S15; Yes), the control section 110 determines whether the division page counter D7 is "1" or not (Step S16). When the division page counter D7 is not "1" (Step S16; No), the control section 110 sets the individual image data expanded to the page memory 172 as print page data. Then, this processing is ended.

When the division page counter D7 is "1" (Step S16; Yes), the control section 110 generates image data of a watermark based on the information set in the watermark setting area G31 shown in FIG. 5 to combine the generated watermark image data with the individual image data expanded to the page memory 172 and sets the combined data as print page data (Step S17). Then, the print page setting processing is ended.

FIG. 11 shows a flowchart of a processing executed when the image writing signal PVV is switched from an ON status to an OFF status after the start of the image forming processing.

First, the control section 110 determines whether the image writing signal PVV is switched from an ON status to an OFF status or not (Step S21). When the image writing signal PVV is not switched from an ON status to an OFF status (Step S21; No), the control section 100 waits until the image writing signal PVV is switched from an ON status to an OFF status.

When the image writing signal PVV is switched from an ON status to an OFF (Step S21; Yes), the status control section 110 refers the job data to determine whether the post-processing mode D4 and the watermark formation D5 are both set or not (i.e., whether stapling and watermark formation are set or not) (Step S22). When neither the post-processing mode D4 nor the watermark formation D5 is not set (Step S22; No), other processings are executed (Step S23).

When the post-processing mode D4 and the watermark formation D5 are both set (Step S22; Yes), the control section 110 adds "1" to the print page number D6 (Step S24).

The control section 110 determines whether the post-processing information D12 corresponding to the identification number of the document page shown by the print page number D6 just before the addition of "1" to the print page number D6 specifies a post-processing (e.g., stapling) or not (Step S25).

When the post-processing information D12 corresponding to the immediately preceding print page number D6 does not specify a post-processing (e.g., no stapling) (Step S25; No), the control section 110 determines whether the post-processing information D12 corresponding to the print page number D6 to which "1" is added in Step S24 specifies a post-processing (e.g., stapling) or not (Step S26).

When the post-processing information D12 corresponding to print page number D6 does not specify a post-processing (no stapling) (Step S26; No), the control section 110 adds "1" to the division page counter D7 (Step S27) to proceed to Step S31.

When the post-processing information D12 corresponding to print page number D6 specifies a post-processing (stapling) (Step S26; Yes), the control section 110 proceeds to Step S29.

When the post-processing information D12 corresponding to the print page number D6 just before the addition of "1" to the print page number D6 specifies a post-processing (stapling) (Step S25; Yes), the control section 110 determines whether the division information D13 corresponding to the immediately preceding print page number D6 exists or not (Step S28).

When the division information D13 corresponding to the immediately preceding print page number D6 does not exist (Step S28; No), the control section 110 proceeds to Step S27.

When the division information D13 corresponding to the immediately preceding print page number D6 exists (Step S28; Yes), the control section 110 determines whether the addition booklet setting section G31$f$ is checked or not, i.e., whether the addition booklet setting D5$b$ is "0" or not. Therefore, it is determined whether a watermark is formed only at a booklet formed by the first division of a plurality of divisions or watermarks are formed at all booklets formed by all divisions (Step S29).

When the addition booklet setting section G31$f$ is checked, i.e., when it is determined that a watermark is formed only at a booklet formed by the first division of a plurality of division (Step S29; first division) because the addition booklet setting section G31$f$ is checked and the addition booklet setting D5$b$ indicates "0", the control section 110 proceeds to Step S27.

When the addition booklet setting section G31$f$ is not checked, i.e., when it is determined that watermarks are formed at all booklets formed by all divisions of a plurality of divisions (Step S29; all divisions) because the addition booklet setting section G31$f$ is not checked and the addition booklet setting D5$b$ indicates "1", the control section 110 initializes the division page counter D7 (i.e., sets the division page counter D7 to "1") (Step S30).

After Step S27 or Step S30, the control section 110 executes the above-described print page setting processing (Step S31).

After the print page setting processing (after Step S31), the control section 110 completes the processing executed when the image reading signal SVV is switched from an ON status to an OFF status.

Figure 12A:
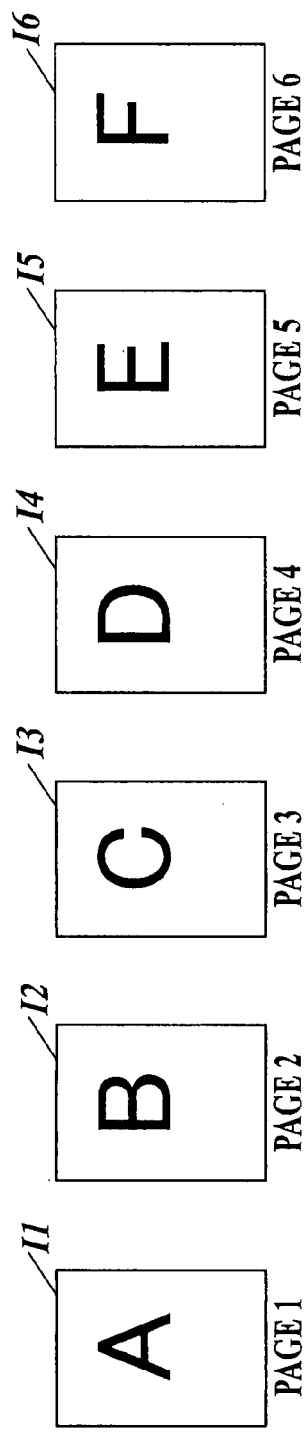
FIG. 12A illustrates image data having a plurality of individual image data corresponding to a plurality of document pages prepared by application software in an operation apparatus.
Figure 12B:
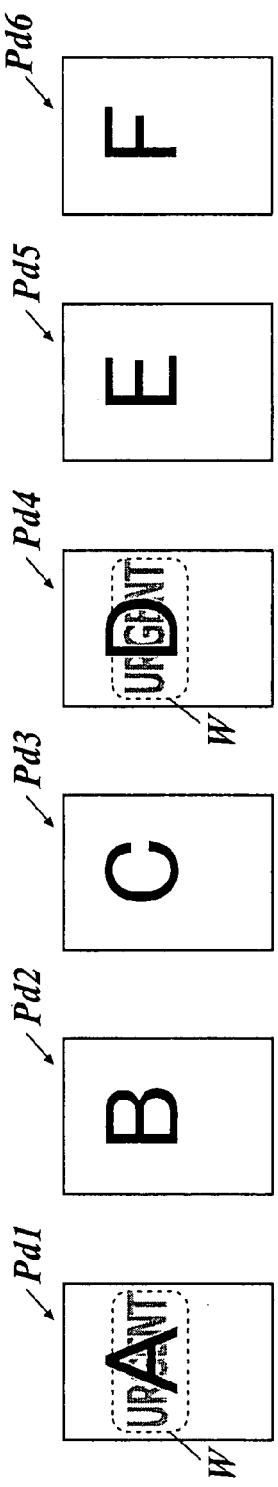
FIG. 12B illustrates print data having a plurality of print page data that is formed on papers by an image forming apparatus.
Figure 12C:
FIG. 12C illustrates an example of a paper bundle that is discharged from the image forming apparatus after a post-processing is carried out.
Figure 13A:
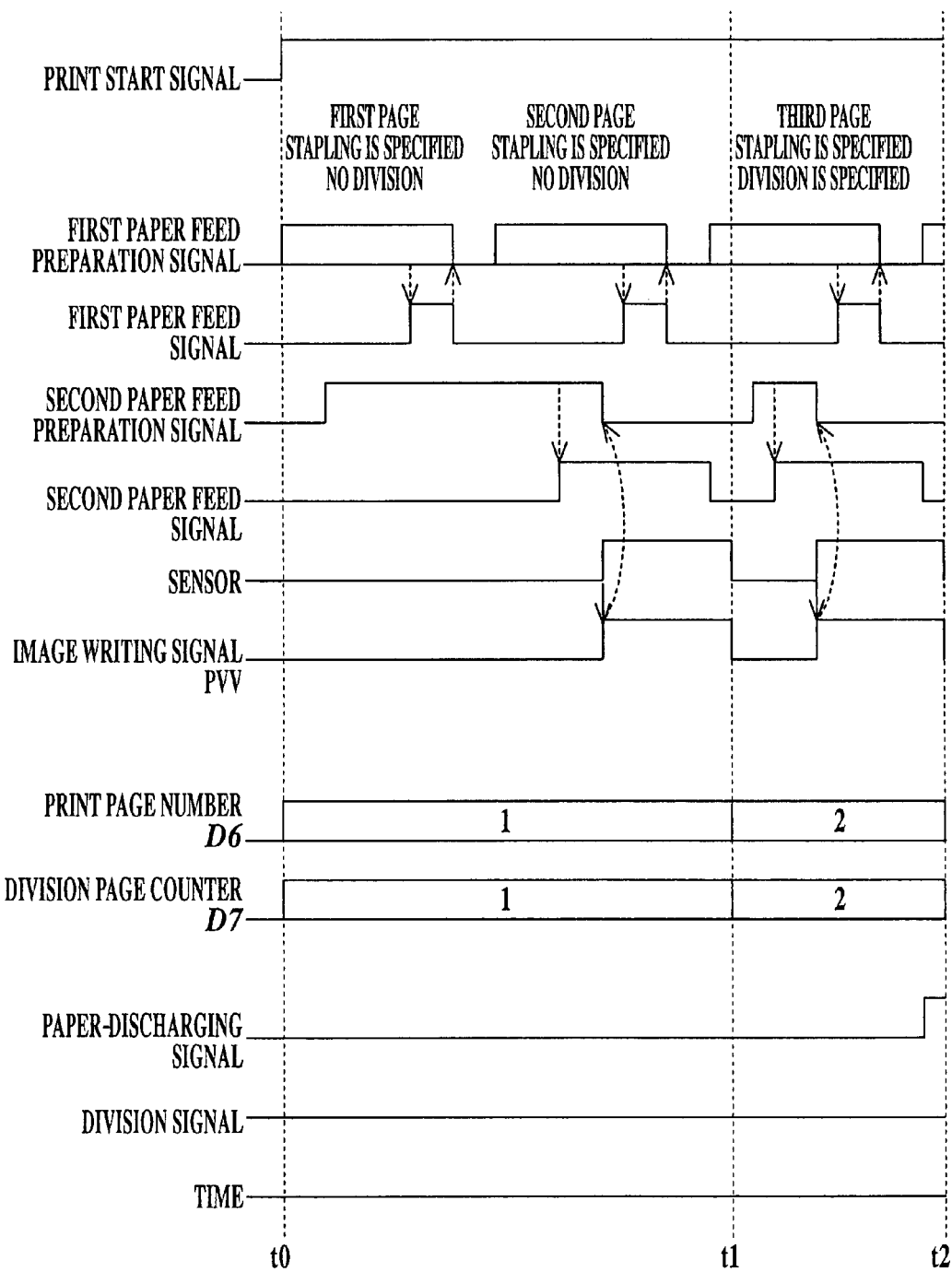
FIGS. 13A, 13B and 13C show an example of a time chart of an operation of the image forming apparatus for realizing the print processings of FIG. 12A, FIG. 12B, and FIG. 12C.
Figure 13B:
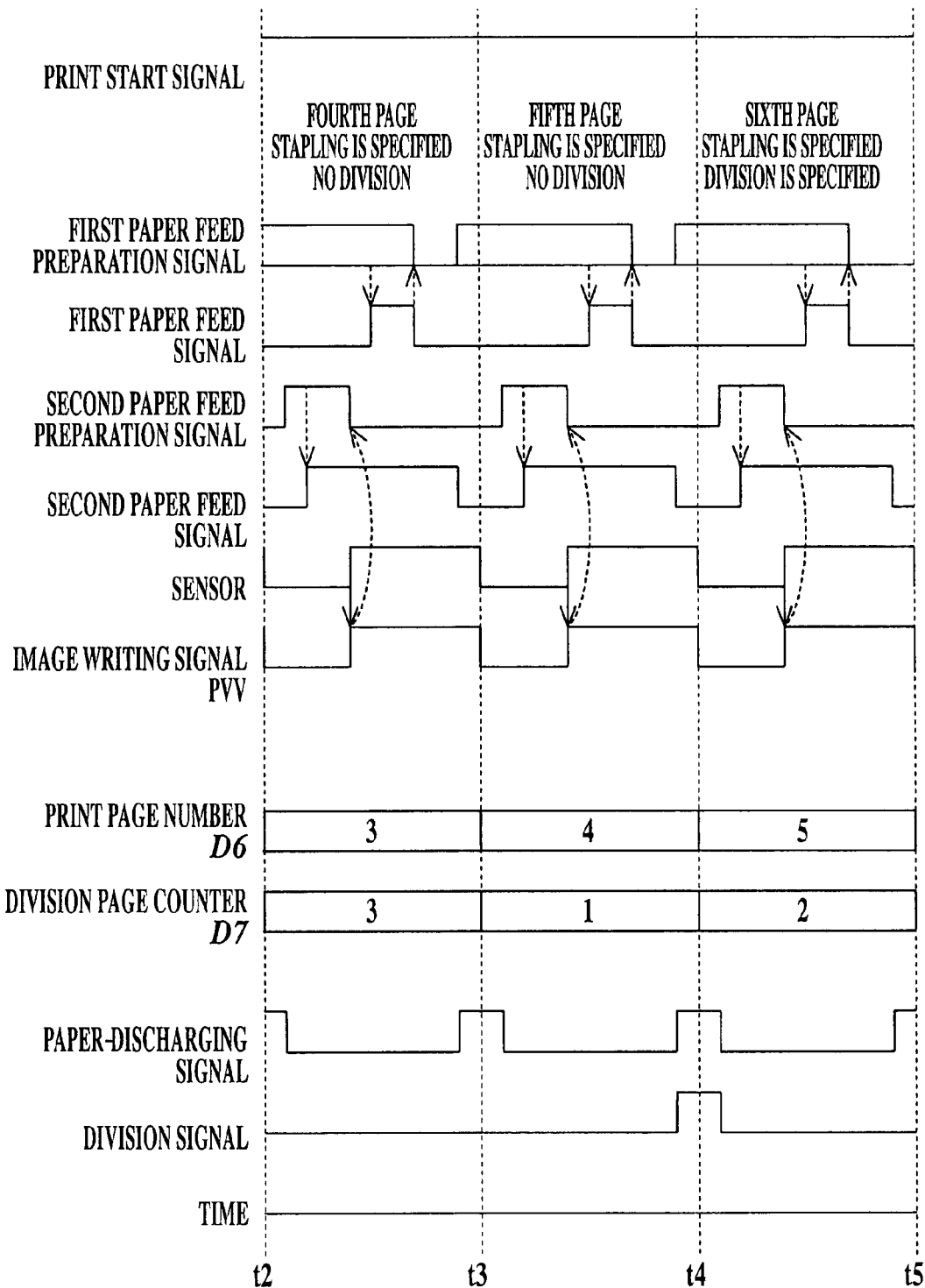
Figure 13C:
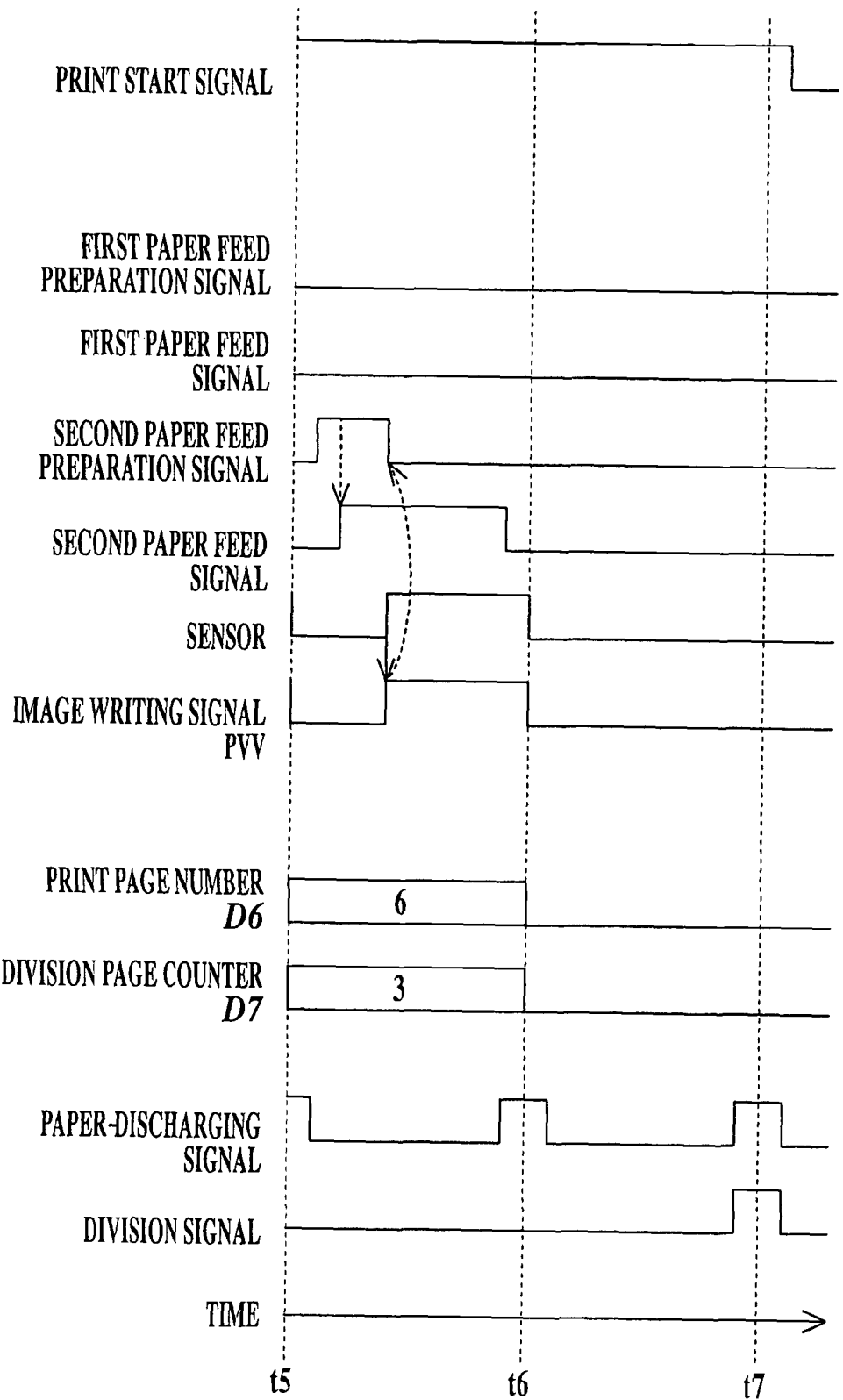

FIG. 12A, FIG. 12B, and FIG. 12C illustrate an example of the print processing executed in this embodiment. FIGS. 13A, 13B and 13C show an example of a time chart of the operation of the image forming apparatus 2 for realizing the print processing of FIG. 12A, FIG. 12B, and FIG. 12C.

FIG. 12A, FIG. 12B, FIG. 12C, FIG. 13A, FIG. 13B and FIG. 13C show an example of an image forming processing in case that in various setting screens shown in FIGS. 3 to 5, the staple setting section G13$a$ is checked to carry out a staple processing at one upper-left position, the page unit setting section G23$a$ is checked, each document page is processed under various setting conditions shown in the list area G23$c$, the watermark setting section G31$a$ is checked, a watermark "urgent" is set by the watermark selection button G31$b$, "overwrite" is set by the type selection button G31$d$, the additional page setting section G31$e$ is checked, and the addition booklet setting section G31$f$ is not checked.

FIG. 12A illustrates image data having a plurality of individual image data corresponding to a plurality of document pages, which are prepared by application software in the operation apparatus 1. FIG. 12B illustrates print data having data of a plurality of print pages, which are formed on papers by the image forming apparatus 2. FIG. 12C illustrates an example of post-processed paper bundles discharged from the image forming apparatus 2.

The image data prepared by the operation apparatus 1 and shown in FIG. 12A includes individual image data I1 to I6 corresponding to each document page. When the image data are transmitted from the operation apparatus 1 to the image forming apparatus 2, identification numbers for identifying each individual image data (e.g., page 1, page 2 . . . ) are added to each individual image data in the order from the individual image data I1 to the individual image data I6, and are stored as job data.

The print data shown in FIG. 12B includes a plurality of print page data Pd1 to Pd6 obtained by combining individual image data for which watermark addition is specified with image data of the watermarks. For example, the print page data Pd1 and Pd4 are generated by combining the individual image data I1 and I4 with the watermark image data W, respectively.

The paper bundles shown in FIG. 12C are obtained by carrying out a staple processing for the print page data Pd1 to Pd3 to provide one paper bundle and by carrying out a staple processing for the print page data Pd4 to Pd6 to provide one paper bundle.

Next, the example of the time chart shown in FIGS. 13A, 13B and 13C for the operation of the image forming apparatus 2 will be described in case of FIG. 12A, FIG. 12B, and FIG. 12C.

The first paper feed preparation signal is data including information of set print page data, such as information relating to whether a stapling is required or not, whether a division is specified or not. This data is outputted from the control section 110 to the print control section 400 and to the post-processing control section 500 via the print control section 400. The first paper feed signal is an operation signal for conveying the paper P from the paper feed cassette 41$a$ to the resist roller 42$a$. When the first paper feed preparation signal is ON and when the first paper feed signal is in an ON status, it is indicated that a conveying operation is being performed. In accordance with the first paper feed preparation signal, the first paper feed signal is outputted from the print control section 400 to the control section 110.

The second paper feed signal is turned ON at a predetermined time interval.

The second paper feed preparation signal is a signal showing whether an operation for writing print page data can be performed or not. When the second paper feed preparation signal is in an ON status, it is indicated that preparation for writing an image to be written next is completed. When the second paper feed preparation signal is in an OFF status, it is indicated that preparation for writing an image to be written next is being performed. The second paper feed preparation signal is outputted from the control section 110 to the print control section 400. The second paper feed signal is an operation signal for conveying a paper from the resist roller 42a to the transfer device 43a. When the second paper feed preparation signal is in an ON status and the second paper feed signal is in an ON status, it is indicated that a conveying operation is being performed. In accordance with the second paper feed preparation signal, the second paper feed signal is outputted from the print control section 400 to the control section 110.

A paper-discharging signal is an operation signal for discharging a paper on which an image is formed, from the printer 40 to the post-processing device 50. When the paper-discharging signal is in an ON status, it is indicated that a discharge operation is being performed and the paper-discharging signal is outputted from the print control section 400 to the post-processing control section 500. A division signal is a signal indicating whether an image formed on a paper in the paper discharging operation is print page data in which a division is specified or not. When the division signal is in an ON status, it is indicated that a division is specified. The division signal is outputted from the print control section 400 to the post-processing control section 500.

First, by performing the operations shown in FIG. 9 and FIG. 10 at the time t0, various setting conditions and image data set by the operation apparatus 1 or the operation display section 30 are stored as job data in the RAM 130 prior to the start of an image forming and by referring the job data, it is determined whether the post-processing mode D4 and the watermark formation D5 are both set or not (whether stapling and watermark formation are set or not). Then, the print page number D6 and the division page counter D7 of the job data are initialized (i.e., set to "1"). The watermark addition page D5a is set only at the first page and the division page counter D7 is set to "1". Thus, the print page data Pd1 obtained by combining individual image data corresponding to the print page number D6 with the set watermark image data W is generated and set. The print start signal, the copy mode D3 and the post-processing mode D4 for the job data are transmitted to the print control section 400 and the post-processing control section 500.

From the time t0 to t1, the first paper feed signal is turned ON at a predetermined timing and a paper is conveyed from the paper feed cassette 41a to the resist roller 42a. Next, when the second paper feed signal is turned ON at a predetermined timing, a paper is conveyed from the resist roller 42a to the transfer device 43a. When a sensor 42b detects a tip end of the paper, the image writing signal PVV is turned ON to start the writing. By using the set print page data Pd1, an image is formed on a paper of the first page.

The writing is completed at the time t1. When the image writing signal PVV is switched from an ON status to an OFF status, the operations shown in FIG. 10 and FIG. 11 are executed to add "1" to the print page number D6. Then, the print page number D6 indicates "2". Individual image data corresponding to the print page number (D6=1) prior to the addition of "1" to the print page number indicates that a stapling is specified and no division is specified. Thus, "1" is added to the division page counter D7. Then, the division page counter D7 indicates "2". The division page counter D7 of the individual image data corresponding to the print page number D6 does not indicate "1". Thus, the print page data Pd2 of the second page is generated and set as the individual image data corresponding to the print page number (D6=2).

From the time t1 to t2, a paper is conveyed from the resist roller 42a to the transfer device 43a. Next, the image writing signal PVV is turned ON. By using the set print page data Pd2, an image is formed on a paper of the second page.

When the image writing signal PVV is switched from an ON status to an OFF status at the time t2, the operations shown in FIG. 10 and FIG. 11 are executed to add "1" to the print page number D6. Then, the print page number D6 indicates "3". The individual image data corresponding to the print page number (D6=2) prior to the addition of "1" to the print page number indicates that a stapling is specified and no division is specified. Thus, "1" is added to the division page counter D7. Then, the division page counter D7 indicates "3". The division page counter D7 of the individual image data corresponding to the print page number D6 does not indicate "1". Thus, the print page data Pd3 is generated and set as the individual image data corresponding to the print page number (D6=3).

At the time t2, a paper of the first page is discharged to the post-processing device 50.

From the time t2 to t3, a paper of the third page is conveyed from the resist roller 42a to the transfer device 43a. Next, the image writing signal PVV is in an ON status. By using the set print page data Pd3, the image is formed on the paper of the third page.

At the time t3, when the image writing signal PVV is switched from an ON status to an OFF status, the operations shown in FIG. 10 and FIG. 11 are executed to add "1" to the print page number D6. Then, the print page number D6 indicates "4". The individual image data corresponding to the print page number (D6=3) prior to the addition of "1" to the print page number indicates that a stapling is specified and a division is specified. Further, the addition booklet setting section G31f is not checked. Thus, the addition booklet setting D5b is set to "1" to specify that watermarks should be formed at all divisions. Thus, the division page counter D7 is initialized to set the division page counter D7 to "1". Because the additional page setting section G31e is also checked, the watermark addition page D5a is set only for the first page. Since the division page counter D7 is set to "1", the individual image data corresponding to the print page number D6 is combined with the set watermark mage data W to generate and set the print page data Pd4.

At the time t3, the paper of the second page is discharged to the post-processing device 50.

From the time t3 to t4, the paper of the fourth page is conveyed from the resist roller 42a to the transfer device 43a. Next, the image writing signal PVV is in an ON status. By using the set print page data Pd4, the image is formed on the paper of the fourth page.

When the image writing signal PVV is switched from an ON status to an OFF status at the time t4, the operations shown in FIG. 10 and FIG. 11 are executed to add "1" to the print page number D6. Then, the print page number D6 indicates "5". The individual image data corresponding to the print page number (D6=4) prior to the addition of "1" to the print page number indicates that a stapling is specified and no division is specified. Thus, "1" is added to the division page counter D7. Then, the division page counter D7 indicates "2". The division page counter D7 of the individual image data corresponding to the print page number D6 does not indicate "1". Thus, the print page data Pd5 is generated and set as the individual image data corresponding to the print page number (D6=5).

At the time t4, the paper of the third page is discharged to the post-processing device 50 and the division signal is in an ON status. Thus, a staple processing is carried out for a bundle having papers from the first page to the third page discharged to the post-processing device 50 from the time t0 to t4.

From the time t4 to t5, the paper of the fifth page is conveyed from the resist roller 42a to the transfer device 43a. Next, the image writing signal PVV is in an ON status. By using the set print page data Pd5, an image is formed on the paper of the fifth page.

When the image writing signal PVV is switched from an ON status to an OFF status at the time t5, the operations shown in FIG. 10 and FIG. 11 are executed to add "1" to the print page number D6. Then, the print page number D6 indicates "6". The individual image data corresponding to the print page number (D6=5) prior to the addition of "1" to the print page number indicates that a stapling is specified and no division is specified. Thus, "1" is added to the division page counter D7. Then, the division page counter D7 indicates "3". The division page counter D7 of the individual image data corresponding to the print page number D6 does not indicate "1". Thus, the print page data Pd6 is generated and set as the individual image data corresponding to the print page number (D6=6).

At the time t5, the paper of the fourth page is discharged to the post-processing device 50.

From the time t5 to the time t6, a paper of the sixth page is conveyed from the resist roller 42a to the transfer device 43a. Next, the image writing signal PVV is in an ON status. By using the set print page data Pd6, an image is formed on the paper of the sixth page.

At the time t6, the paper of the fifth page is discharged to the post-processing device 50.

Then, at the time t7, the paper of the sixth page is discharged to the post-processing device 50 and the division signal is in an ON status. Thus, a staple processing is carried out for a bundle having papers from the fourth page to the sixth page discharged to the post-processing device 50 from the time t4 to t7. Then, the print processing is ended.

Figure 14:
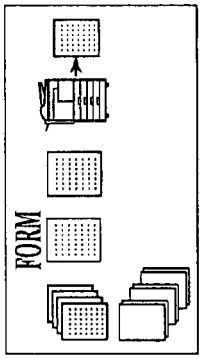
FIG. 14 shows an example of a page unit setting screen.

With reference to FIGS. 14 to 16, another example to which the present invention is applied will be described.

Figure 15A:
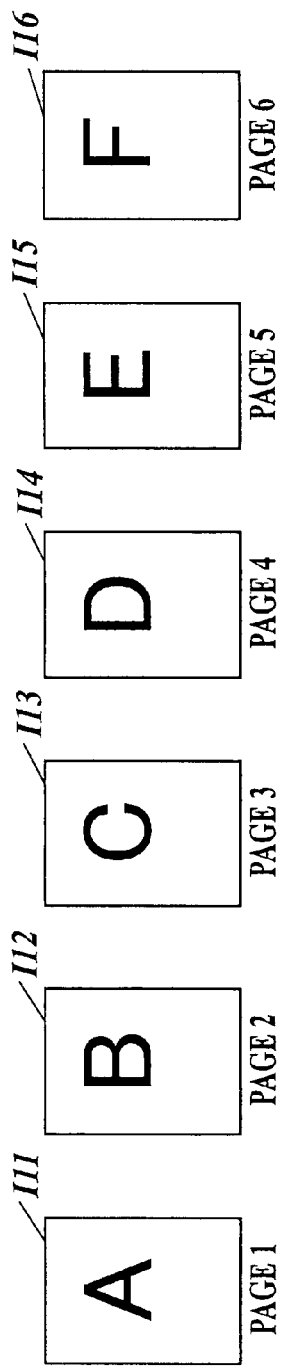
FIG. 15A illustrates image data having a plurality of individual image data corresponding to a plurality of document pages that is prepared by the application software in the operation apparatus.
Figure 15B:
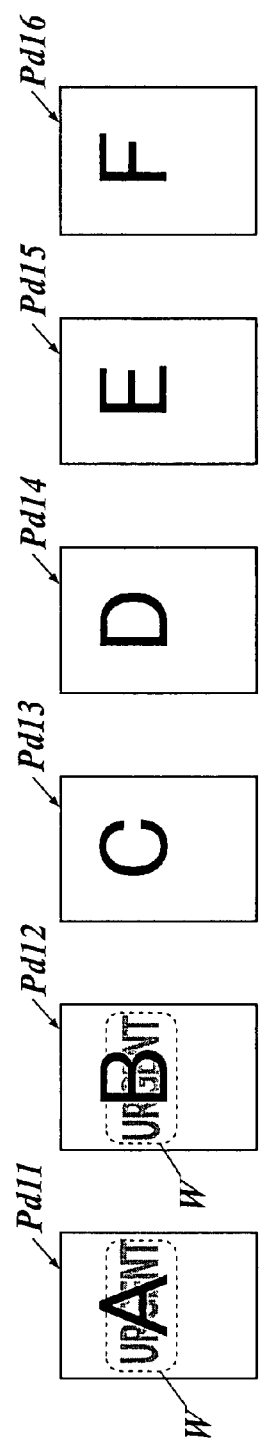
FIG. 15B shows print data having a plurality of print page data formed on papers by the image forming apparatus.
Figure 15C:
FIG. 15C shows an example of a paper and a paper bundle that are discharged from the image forming apparatus after a post-processing is carried out.
Figure 16A:
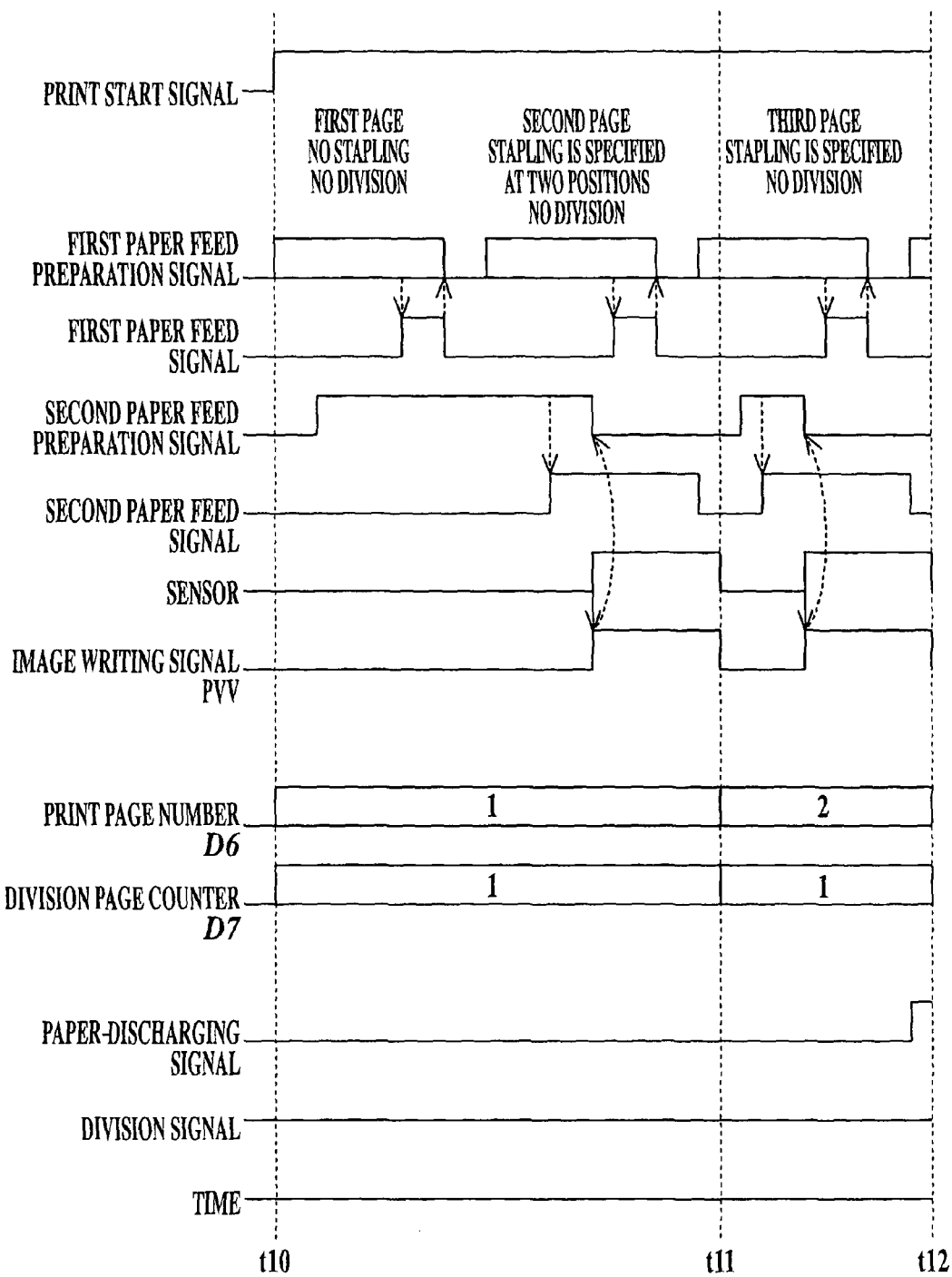
FIGS. 16A, 16B and 16C show an example of an operation of the image forming apparatus for realizing the print processings of FIG. 15A, FIG. 15B, and FIG. 15C.
Figure 16B:
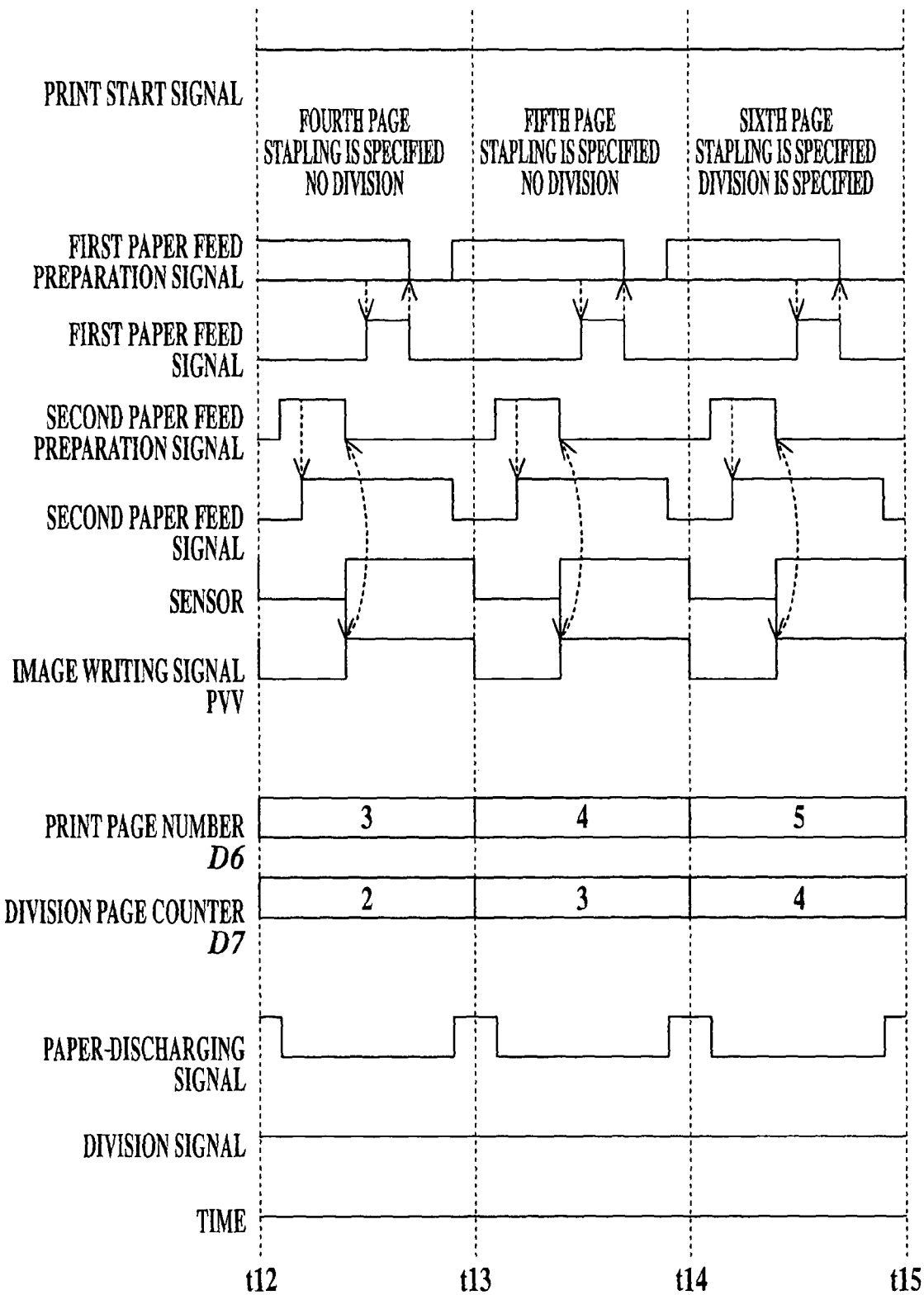
Figure 16C:
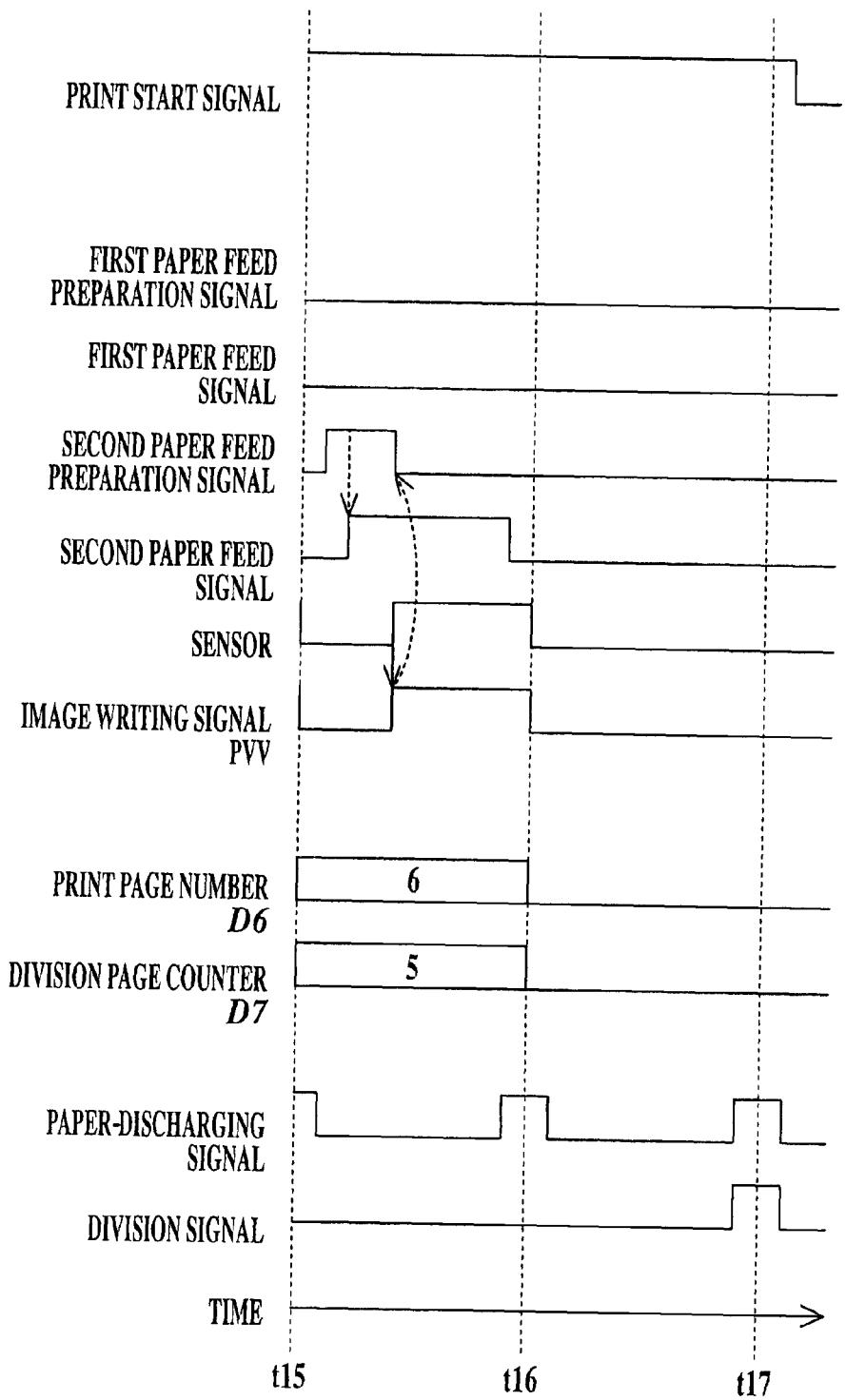

FIG. 14 illustrates a page unit setting screen G20b. FIG. 15A, FIG. 15B, and FIG. 15C illustrate an example of the print processing executed in this embodiment. FIGS. 16A, 16B and 16C illustrate an example of a time chart of the operation of the image forming apparatus 2 for realizing the print processings of FIG. 15A, FIG. 15B, and FIG. 15C.

The page unit setting screen G20b shown in FIG. 14 is the same as the page setting screen G20a shown in FIG. 4 except that the list area G23c is replaced with a list area G23d. Thus, the same elements are denoted with the same reference numerals and only different elements will be described.

In the list area G23d shown in FIG. 14, each condition of six document pages is individually set. For example, a document page having an identification number of "1" is set so that no stapling is specified and the end position of the stapling is not specified. Document pages of identification numbers of 2 to 5 are set so that the stapling is specified at one position and the end position of the stapling is not specified. A document page of an identification number of "6" is set so that a stapling is specified at one position and the end position of the stapling is specified. As a result, the image of the document page of the identification number of "1" and a bundle (booklet) obtained by carrying out a staple processing for papers of document pages of the identification numbers of 2 to 6 on images are formed, are prepared and discharged.

FIG. 15A, FIG. 15B, FIG. 15C, FIG. 16A, FIG. 16B and FIG. 16C illustrate an example of an image forming processing in case that in various setting screens shown in FIG. 3, FIG. 5, and FIG. 14, the staple setting section G13a is checked to carry out a staple processing at one upper-left position, the page unit setting section G23a is checked, each document page is processed under various setting conditions shown in the list area G23d, the watermark setting section G31a is checked, a watermark "urgent" is set by the watermark selection button G31b, "overwrite" is selected by the type selection button G31d, the additional page setting section G31e is checked, and the addition booklet setting section G31f is not checked.

FIG. 15A illustrates image data having a plurality of individual image data corresponding to a plurality of document pages, which are prepared by an application software in the operation apparatus 1. FIG. 15B illustrates print data having data of a plurality of print page, which are formed on papers by the image forming apparatus 2. FIG. 15C illustrates an example of a post-processed paper and a post-processed paper bundle discharged from the image forming apparatus 2.

The image data prepared by the operation apparatus 1 and shown in FIG. 15A includes the individual image data I11 to I16 corresponding to each document page. When the image data are transmitted from the operation apparatus 1 to the image forming apparatus 2, identification numbers for identifying each individual image data (e.g., page 11, page 12 . . . ) are added to each individual image data in the order from the individual image data I11 to the individual image data I16, and are stored as job data.

The print data shown in FIG. 15B includes a plurality of print page data Pd11 to Pd16 obtained by combining individual image data for which watermark addition is set with image data of the watermarks. For example, the print page data Pd11 and Pd12 are generated as data obtained by combining the individual image data I11 and I12 with watermark image data W, respectively.

The paper bundle shown in FIG. 15C shows a paper on which the print page data Pd11 is formed and one booklet as one paper bundle obtained by carrying out a staple processing for the print page data Pd2 to Pd6.

Next, an example of the time chart shown in FIGS. 16A, 16B and 16C for the operation of the image forming apparatus 2 will be described in case of FIG. 15A, FIG. 15B, and FIG. 15C.

Various signals shown in FIGS. 16A, 16B and 16C are the same as those shown in the time chart of FIGS. 13A, 13B and 13C and will not be described further.

First, by performing the operations shown in FIGS. 9 and 10 at the time t10, various setting conditions and image data set by the operation apparatus 1 or the operation display section 30 are stored as job data in the RAM 130 prior to the start of the image forming processing and by referring the job data, it is determined whether the post-processing mode D4 and the watermark formation D5 are both set or not (whether stapling and watermark formation are set or not). Then, the print page number D6 and the division page counter D7 of the job data are initialized to set them to "1". When the watermark addition page D5a is set only at the first page and the division page counter D7 is set to "1", the print page data Pd1 obtained by combining the individual image data corresponding to the print page number D6 with the set watermark image data W is generated and set. The print start signal, the copy mode D3 and the post-processing mode D4 for the job data are transmitted to the print control section 400 and the post-processing control section 500.

From the time t10 to t11, the paper of the first page is conveyed from the paper feed cassette 41a to the resist roller 42a. Next, the paper is conveyed from the resist roller 42a to the transfer device 43a. When the sensor 42b detects a tip end of the paper, the image writing signal PVV is ON to form the image on the paper of the first page by using the set print page data Pd11.

At the time t11, when the writing is completed and the image writing signal PVV is switched from an ON status to an OFF status, the operations shown in FIGS. 10 and 11 are executed to add "1" to the print page number D6. Then, the print page number D6 indicates "2". The individual image data corresponding to the print page number (D6=1) prior to the addition of "1" to the print page number indicates that no stapling is specified, and the print page number (D6=2) indicates that a stapling is specified. Further, when the addition booklet setting section G31f is not checked, the addition booklet setting D5b is set to "1". When the apparatus is set so that watermarks are formed in all divisions, the division page counter D7 is initialized and is set to D7=1. When the additional page setting section G31e is checked, the watermark addition page D5a is set only for the first page. Since the division page counter D7 is set to "1", the print page data Pd12 obtained by combining the individual image data corresponding to the print page number D6 with the watermark image data W is generated and set.

From the time t11 to t12, the paper of the second page is conveyed from the resist roller 42a to the transfer device 43a. Next, the image writing signal PVV is in an ON status. By using the set print page data Pd12, the image is formed on the paper of the second page.

When the image writing signal PVV is switched from the ON status to the OFF status at the time t12, the operations shown in FIG. 10 and FIG. 11 are executed to add "1" to the print page number D6. Then, the print page number D6 indicates "3". The individual image data corresponding to the print page number (D6=2) prior to the addition of "1" to the print page number indicates that a stapling is specified and no division is specified. Thus, "1" is added to the division page counter D7. Then, the division page counter D7 indicates "2". Since the division page counter D7 of the individual image data corresponding to the print page number D6 does not indicate "1", the print page data Pd13 corresponding to the print page number (D6=3) is generated and set.

At the time t12, the paper of the first page is discharged.

From the time t12 to t13, the paper of the third page is conveyed from the resist roller 42a to the transfer device 43a. Next, the image writing signal PVV is in an ON status. By using the set print page data Pd13, the image is formed on the paper of the third page.

When the image writing signal PVV is switched from an ON status to an OFF status at the time t13, the operations shown in FIG. 10 and FIG. 11 are executed to add "1" to the print page number D6. Then, the print page number D6 indicates "4". The individual image data corresponding to the print page number (D6=3) prior to the addition of "1" to the print page number indicates that a stapling is specified and no division is specified. Thus, "1" is added to the division page counter D7. Then, the division page counter D7 indicates "3". The division page counter D7 of the individual image data corresponding to the print page number D6 does not indicate "1". Thus, the print page data Pd14 corresponding to the print page number (D6=4) is generated and set.

At the time t13, the paper of the second page is discharged to the post-processing device 50.

From the time t13 to t14, the paper of the fourth page is conveyed from the resist roller 42a to the transfer device 43a. Next, the image writing signal PVV is in an ON status. By using the set page data Pd14, the image is formed on the paper of the fourth page.

When the image writing signal PVV is switched from an ON status to an OFF status at the time t14, the operations shown in FIG. 10 and FIG. 11 are executed to add "1" to the print page number D6. Then, the print page number D6 indicates "5". The individual image data corresponding to the print page number (D6=4) prior to the addition of "1" to the print page number indicates that a stapling is specified and no division is specified. Thus, "1" is added to the division page counter D7. Then, the division page counter D7 indicates "4". Since the division page counter D7 of the individual image data corresponding to the print page number D6 does not indicate "1", the print page data Pd15 corresponding to the print page number (D6=5) is generated and set.

At the time t14, the paper of the third page is discharged to the post-processing device 50.

From the time t14 to t15, the paper of the fifth page is conveyed from the resist roller 42a to the transfer device 43a. Next, the image writing signal PVV is in an ON status. based By using the set print page data Pd15, the image is formed on the paper of the fifth page.

When the image writing signal PVV is switched from an ON status to an OFF status at the time t15, The operations shown in FIG. 10 and FIG. 11 are executed to add "1" to the print page number D6. Then, the print page number D6 indicates "6". The individual image data corresponding to the print page number (D6=5) prior to the addition of "1" to the print page number indicates that a stapling is specified and no division is specified. Then, "1" is added to the division page counter D7. Then, the division page counter D7 indicates "5". Since the division page counter D7 of the individual image data corresponding to the print page number D6 does not indicate "1", the print page data Pd16 corresponding to the print page number (D6=6) is generated and set.

At the time t15, the paper of the fourth page is discharged to the post-processing device 50.

From the time t15 to t16, the paper of the sixth page is conveyed from the resist roller 42a to the transfer device 43a. Next, the image writing signal PVV is in an ON status. By using the set print page data Pd16, the image is formed on the paper of the sixth page.

At the time t16, the paper of the fifth page is discharged to the post-processing device 50.

At the time t17, the paper of the sixth page is discharged to the post-processing device 50 and a division signal is in an ON status. Thus, from the time t13 to the time t17, a staple processing is carried out for a bundle of papers from the second page to the sixth page discharged to the post-processing device 50. Then, the print processing is ended.

As described above, according to the present invention, watermarks as an additional image can be formed at the first document page (the first page) in each division without requiring an operation of a user. Thus, for example, watermarks can be always formed on papers at the first pages of paper bundles for which a staple processing is carried out. As a result, it is possible to save a user the trouble of setting watermarks to each division of document pages for which a post-processing is carried out. Thus, it is possible to improve the usability for the user.

Furthermore, a user also can arbitrarily select whether an additional image is formed only in the first division of a plurality of divisions of document pages or additional images are formed in all divisions. Thus, it is possible to improve the usability for the user. Furthermore, a user can select the type of a watermark as an additional image. Thus, a watermark of the type desired by the user can be formed on a paper.

The present invention is not limited to the contents of the above embodiments. The embodiments can be appropriately changed within the gist of the present invention.

The present U.S. patent application claims the priority of Japanese Patent Application No. 2007-040564 filed on Feb. 21, 2007, according to the Paris Convention, and the above Japanese Patent Application is the basis for correcting mistranslation of the present U.S. patent application.

What is claimed is:

1. An image forming apparatus, comprising:
an image forming section for forming images on papers based on image data of a document having a plurality of document pages and an additional image which is previously set;
a post-processing device for carrying out a post-processing for the papers;
a first input section for inputting and setting a division of the post-processing of the document pages;
a second input section for setting the additional image so as to be formed on a first document page of the plurality of document pages; and
a control section for causing the image forming section to form the additional image on the first document page of each division when the division of the post-processing of the document pages is set by the first input section and when the additional image is set by the second input section so as to be formed on the first document page of the plurality of document pages.

2. The image forming apparatus of claim 1, further comprising:
a third input section for inputting a setting for determining whether the additional image is formed only in a first division of a plurality of divisions of the document pages or not,
wherein the control section controls the forming of the additional image in each division of the document pages based on the setting inputted by the third input section.

3. The image forming apparatus of claim 1, wherein:
the post-processing is a staple processing for binding the plurality of papers on which the images are formed.

4. The image forming apparatus of claim 1, further comprising:
a fourth input section for inputting and setting a selected type of the additional image.

5. An image forming apparatus, comprising:
an image forming section for forming images on papers based on image data of a document having a plurality of document pages and an additional image which is previously set;
a post-processing device for carrying out a post-processing for the papers;
a first input section for setting a booklet dividing mode in which papers for which the post-processing is carried out and papers for which the post-processing is not carried out are mixed in the papers on which the images are formed by the image forming section and for setting a division of the post-processing of the document pages;
a second input section for setting the additional image so as to be formed on a first document page of the plurality of document pages; and
a control section for causing the image forming section to form the additional image on the first document page of each division when the booklet dividing mode is set by the first input section and when the additional image is set by the second input section so as to be formed on the first document page of the plurality of document pages.

6. The image forming apparatus of claim 5, further comprising:
a third input section for inputting a setting for determining whether the additional image is formed only in a first division of a plurality of divisions of the document pages or not,
wherein the control section controls the forming of the additional image in each division of the document pages based on the setting inputted by the third input section.

7. The image forming apparatus of claim 5, wherein:
the post-processing is a staple processing for binding the plurality of papers on which the image is formed.

8. The image forming apparatus of claim 5, further comprising:
a fourth input section for inputting and setting a selected type of the additional image.

9. An image forming system comprising:
an operation apparatus for transmitting image data of a document having a plurality of document pages, an instruction for forming an additional image which is previously set, on a paper on which an image is formed based on the image data, and an instruction for carrying out a post-processing for the paper; and
an image forming apparatus comprising an image forming section for forming the image on the paper based on the image data received from the operation apparatus, and for forming the additional image on the paper in accordance with the instruction for forming the additional image which is previously on the paper; and a post-processing device for carrying out the post-processing for the papers,
wherein the operation apparatus is connected to the image forming apparatus so as to be communicable with each other,
wherein the operation apparatus comprises:
a first input section for inputting a setting of a division of the document pages for which the post-processing is carried out; and
a second input section for inputting a setting for forming the additional image on a first document page of the plurality of document pages, and
wherein the image forming apparatus comprises:
a control section for causing the image forming section to form the additional image on the first document page of each division when the division of the document pages for which the post-processing is carried out is set by the first input section and when the setting for forming the additional image on the first document page of the plurality of document pages is inputted by the second input section.

10. The image forming system of claim 9, wherein:
the operation apparatus comprises:
a third input section for inputting a setting for determining whether the additional image is formed only in a first division of a plurality of divisions of the document pages or not, and
the control section controls the forming of the additional image in each division of the document pages based on the setting inputted by the third input section.

11. The image forming system of claim 9, wherein:
the post-processing is a staple processing for binding the plurality of papers on which the images are formed.

12. The image forming system of claim 9, wherein:
the operation apparatus comprises a fourth input section for inputting and setting a selected type of the additional image.

13. An image forming system comprising:
an operation apparatus for transmitting image data of a document having a plurality of document pages, an instruction for forming an additional image which is previously set, on a paper on which an image is formed based on the image data, and an instruction for carrying out a post-processing for the paper; and
an image forming apparatus comprising an image forming section for forming the image on the paper based on the image data received from the operation apparatus, and for forming the additional image on the paper in accordance with the instruction for forming the additional image which is previously on the paper; and a post-processing device for carrying out the post-processing for the papers,
wherein the operation apparatus is connected to the image forming apparatus so as to be communicable with each other,
wherein the operation apparatus comprises:
a first input section for inputting a setting of a booklet dividing mode in which papers for which the post-processing is carried out and papers for which the post-processing is not carried out are mixed in the papers on which the images are formed by the image forming section, and a setting a division of the document pages for which the post-processing is carried out; and
a second input section for inputting a setting for forming the additional image on a first document page of the plurality of document pages, and
the image forming apparatus comprises:
a control section for causing the image forming section to form the additional image on the first document pages of each division when the booklet dividing mode is set by the first input section and when the setting for forming the additional image on the first document page of the plurality of document pages is inputted by the second input section.

14. The image forming system of claim 13, wherein:
the operation apparatus comprises:
a third input section for inputting a setting for determining whether the additional image is formed only in a first division of a plurality of divisions of the document pages or not, and
the control section controls the forming of the additional image in each division of the document pages based on the setting inputted by the third input section.

15. The image forming system of claim 13, wherein:
the post-processing is a staple processing for binding a plurality of papers on which the images are formed.

16. The image forming system of claim 13, wherein:
the operation apparatus comprises a fourth input section for inputting and setting a selected type of the additional image.

* * * * *